United States Patent
Kim et al.

(10) Patent No.: US 11,667,041 B2
(45) Date of Patent: Jun. 6, 2023

(54) ROBOT CLEANER, STATION AND CLEANING SYSTEM

(71) Applicant: Samsung Electronics Co., Ltd., Suwon-si (KR)

(72) Inventors: Sin Ae Kim, Suwon-si (KR); Byoung In Lee, Suwon-si (KR); Dong Woo Ha, Suwon-si (KR); Seok Man Hong, Suwon-si (KR); Dong Jun Kim, Suwon-si (KR); Ji Won Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 671 days.

(21) Appl. No.: 16/673,059

(22) Filed: Nov. 4, 2019

(65) Prior Publication Data

US 2020/0139561 A1    May 7, 2020

(30) Foreign Application Priority Data

Nov. 6, 2018 (KR) .................. 10-2018-0135196

(51) Int. Cl.
*A47L 11/10* (2006.01)
*A47L 11/40* (2006.01)
(Continued)

(52) U.S. Cl.
CPC .......... *B25J 15/0441* (2013.01); *A47L 11/10* (2013.01); *A47L 11/4036* (2013.01); *A47L 13/16* (2013.01);
(Continued)

(58) Field of Classification Search
CPC .. A47L 11/10; A47L 11/4036; A47L 2201/02; A47L 2201/028; B25J 9/0003;
(Continued)

(56) References Cited

U.S. PATENT DOCUMENTS 9,717,388 B2   8/2017 Jeong et al.
2003/0192140 A1   10/2003 Guest
(Continued)

FOREIGN PATENT DOCUMENTS

CN   204562007 U   8/2015
CN   107713916 A   2/2018
(Continued)

OTHER PUBLICATIONS

Chinese Office Action dated Mar. 23, 2022, issued in Chinese Patent Application No. 2019800717284.
(Continued)

*Primary Examiner* — Randall E Chin
(74) *Attorney, Agent, or Firm* — Jefferson IP Law, LLP

(57) ABSTRACT

A cleaning system is provided. The cleaning system includes a robot cleaner and a station. The robot cleaner includes a pad fixing part on which a cleaning pad is detachably mounted, a lifter to lift a part of the robot cleaner at which the pad fixing part is positioned, and a pad detacher to detach the cleaning pad mounted on the pad fixing part. The station includes a pad storage box in which a cleaning pad that is to be provided to the robot cleaner is stored, a pad coupling part on which a cleaning pad that is to be coupled to the robot cleaner is rested, and a pad supplier to supply the cleaning pad stored in the pad storage box to the pad coupling part.

20 Claims, 36 Drawing Sheets

(51) Int. Cl.
*B25J 11/00* (2006.01)
*B25J 15/04* (2006.01)
*B25J 9/00* (2006.01)
*B25J 15/00* (2006.01)
*A47L 13/16* (2006.01)

(52) U.S. Cl.
CPC ......... *B25J 9/0003* (2013.01); *B25J 11/0085* (2013.01); *B25J 15/0019* (2013.01); *A47L 2201/028* (2013.01)

(58) Field of Classification Search
CPC . B25J 11/0085; B25J 15/0441; B25J 15/0019
See application file for complete search history.

(56) References Cited

U.S. PATENT DOCUMENTS

| | | | |
|---|---|---|---|
| 2011/0202175 A1* | 8/2011 | Romanov | A47L 11/4036 700/250 |
| 2015/0182089 A1 | 7/2015 | Jeong et al. | |
| 2018/0064305 A1 | 3/2018 | Lu et al. | |

FOREIGN PATENT DOCUMENTS

| | | | |
|---|---|---|---|
| CN | 207755219 U | | 8/2018 |
| DE | 20 2016 104 067 U1 | * | 10/2017 |
| JP | 2017-127595 A | | 7/2017 |
| KR | 10-2007-0101432 A | | 10/2007 |
| KR | 10-2008-0105538 A | | 12/2008 |
| KR | 10-2015-0078093 A | | 7/2015 |
| KR | 10-1670419 B1 | | 10/2016 |
| WO | 2018-107465 A1 | | 6/2018 |

OTHER PUBLICATIONS

International Search Report dated Feb. 26, 2020, issued in an International Application No. PCT/KR2019/014157.
Chinese Office Action with English translation dated Sep. 15, 2022; Chinese Appln. No. 201980071728.4.
Korean Office Action with English translation dated Mar. 24, 2023; Korean Appln. No. 10-2018-0135196.

* cited by examiner

ROBOT CLEANER, STATION AND CLEANING SYSTEM

CROSS-REFERENCE TO RELATED APPLICATION(S)

This application is based on and claims priority under 35 U.S.C. § 119 of a Korean patent application number 10-2018-0135196, filed on Nov. 6, 2018, in the Korean Intellectual Property Office, the disclosure of which is incorporated by reference herein in its entirety.

BACKGROUND

1. Field

The disclosure relates to a robot cleaner, a station and a cleaning system. More particularly, the disclosure relates to a robot cleaner on which a cleaning pad is mounted, a station and a cleaning system.

2. Description of Related Art

A robot cleaner is equipment that cleans the floor by autonomously traveling on an area to be cleaned without a user's operation and vacuuming or collecting foreign substances such as dust from the floor. The robot cleaner cleans an area to be cleaned while traveling on the area to be cleaned.

During cleaning, the robot cleaner determines a distance to an obstacle, e.g., furniture, office appliances, walls, etc., existing in the cleaning area through a distance sensor, and selectively drives a left wheel motor and a right wheel motor to thereby change its driving direction by itself to clean the cleaning area.

Recently, robot cleaners that wipe off dust on the floor, in addition to robot cleaners that absorb foreign substances on the floor, have been developed. In a typical robot cleaner, a pad is detachably attached to the bottom of the robot cleaner by a Velcro or the like. When the pad gets dirty and needs to be replaced with a new one, a user himself/herself lifts the robot cleaner and lays or stands it to then remove the dirty pad from the bottom of the robot cleaner and attach a new pad to the bottom of the robot cleaner.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a cleaning system capable of automatically replacing a pad with a new one.

Another aspect of the disclosure is to provide a robot cleaner and a cleaning system capable of automatically detaching or attaching a pad.

Another aspect of the disclosure is to provide a station and a cleaning system capable of automatically supplying a pad.

Additional aspects will be set forth in part in the description which follows and, in part, will be obvious from the description, or may be learned by practice of the presented embodiments.

In accordance with an aspect of the disclosure, a cleaning system is provided. The cleaning system includes a robot cleaner and a station. The robot cleaner includes a pad fixing part on which a cleaning pad is detachably mounted, a pad detacher to detach the cleaning pad mounted on the pad fixing part, and a cleaner driver to drive the pad detacher. The station includes a pad storage box in which a cleaning pad that is to be provided to the robot cleaner is stored, a pad coupling part on which a cleaning pad that is to be coupled to the robot cleaner is rested, and a pad supplier to supply the cleaning pad stored in the pad storage box to the pad coupling part.

Each of the pad fixing part and the cleaning pad may include a magnetic body.

The robot cleaner may include a lifter to lift a part of the robot cleaner at which the pad fixing part is positioned. The lifter may be driven by the cleaner driver, and the cleaner driver may include a link actuator to transfer power to the lifter and the pad detacher.

The link actuator may be rotatably coupled to a cleaner housing of the robot cleaner, and the lifter may include a lift body rotatably coupled to the link actuator.

The cleaner housing of the robot cleaner may include a lift guide to guide a movement of the lifter.

The pad detacher may include a detacher holder fixed to the cleaner housing of the robot cleaner, a detacher link rotatably coupled to the detacher holder, wherein one end of the detacher link is pressed by the link actuator and is rotatable by being pressed by the link actuator, a detacher rotatably coupled to the detacher holder, wherein one end of the detacher is pressed by the detacher link and is rotatable, and the other end of the detacher is rotatable in a direction in which the cleaning pad is detached from the pad fixing part.

When the link actuator rotates in a first direction, the detacher link may rotate in a second direction that is opposite to the first direction, and the detacher may rotate in the first direction by the rotation of the detacher link to detach the cleaning pad from the pad fixing part, and when the link actuator rotates in the second direction, the detacher link may rotate in the first direction, and the detacher may rotate in the second direction to be spaced away from the cleaning pad.

The cleaning system may further include a station driver to drive the pad supplier, wherein the pad supplier includes a push member that is driven by the station driver to move a cleaning pad among a plurality of cleaning pads stored in the pad storage box to the pad coupling part.

The station driver may include a station driving source, and a connection member to transfer power generated by the station driving source to the push member, and the connection member may include a push link or a belt.

The station may further include a separating and supplying device to move the cleaning pad among the plurality of cleaning pads stacked in the pad storage box to a push position at which the push member is able to push the cleaning pad.

The separating and supplying device may include a link support fixed to a station housing of the station, a pad link rotatably coupled to the link support, a slider link to press one end of the pad link when the slider link is pressed by a slider positioned at one end of the push member, a pad separating member to move to a position of supporting, except for the cleaning pad moved to the push position among the plurality of cleaning pads stored in the pad storage box, a remaining cleaning pad of the cleaning pads, when the pad separating member is pressed by the other end of the pad link, and a pad locker to move to a position of releasing a force supporting the cleaning pad moved to the push position, when the pad separating member moves to the position of supporting the remaining cleaning pad among the plurality of cleaning pads stored in the pad storage box except for the cleaning pad moved to the push position.

The separating and supplying device may include a locking lever connecting the pad separating member with the pad locker such that the pad separating member interworks with the pad locker.

When the push member moves in an opposite direction of a direction in which the cleaning pad moves to the pad coupling part, the slider may be configured to press the slider link.

The separating and supplying device may further include a separating elastic member to apply an elastic force to the pad separating member in a direction in which the pad separating member releases a force supporting the remaining cleaning pad except for the cleaning pad moved to the push position among the plurality of cleaning pads.

At both ends of the cleaning pad, a pad support may extend in a direction in which the plurality of cleaning pads are stacked in the pad storage box.

In accordance with another aspect of the disclosure, a robot cleaner is provided. The robot cleaner includes a pad fixing part on which a cleaning pad is detachably mounted, a pad detacher to detach the cleaning pad mounted on the pad fixing part, a cleaner driver configured to drive the pad detacher, and at least one processor configured to control the pad detacher and the cleaning driver.

Each of the pad fixing part and the cleaning pad may include a magnetic body.

The robot cleaner may further include a lifter to lift a part of the robot cleaner at which the pad fixing part is positioned, wherein the lifter may be driven by the cleaner driver, and wherein the cleaner driver may include a link actuator to transfer power to the lifter and the pad detacher.

In accordance with another aspect of the disclosure, a station is provided. The station includes a pad storage box in which a plurality of cleaning pads are stored, a pad coupling part to supply a cleaning pad to a robot cleaner, and a pad supplier to move a cleaning pad among the plurality of cleaning pads stored in the pad storage box to the pad coupling part.

At both ends of each of the plurality of cleaning pads stored in the pad storage box, a pad support may extend in a direction in which the plurality of cleaning pads are stacked in the pad storage box.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will become apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that when the terms "includes," "comprises," "including," and/or "comprising," when used in this specification, specify the presence of stated features, figures, operations, components, or combination thereof, but do not preclude the presence or addition of one or more other features, figures, operations, components, members, or combinations thereof.

It will be understood that, although the terms "first," "second," etc. may be used herein to describe various components, these components should not be limited by these terms. These terms are only used to distinguish one component from another. For example, a first component could be termed a second component, and, similarly, a second component could be termed a first component, without departing from the scope of the disclosure. As used herein, the term "and/or" includes any and all combinations of one or more of associated listed items.

In the following description, the terms "upper side", "lower side", "front-rear direction", etc. are defined based on the drawings, and the shapes and positions of the corresponding components are not limited by the terms.

Figure 1:
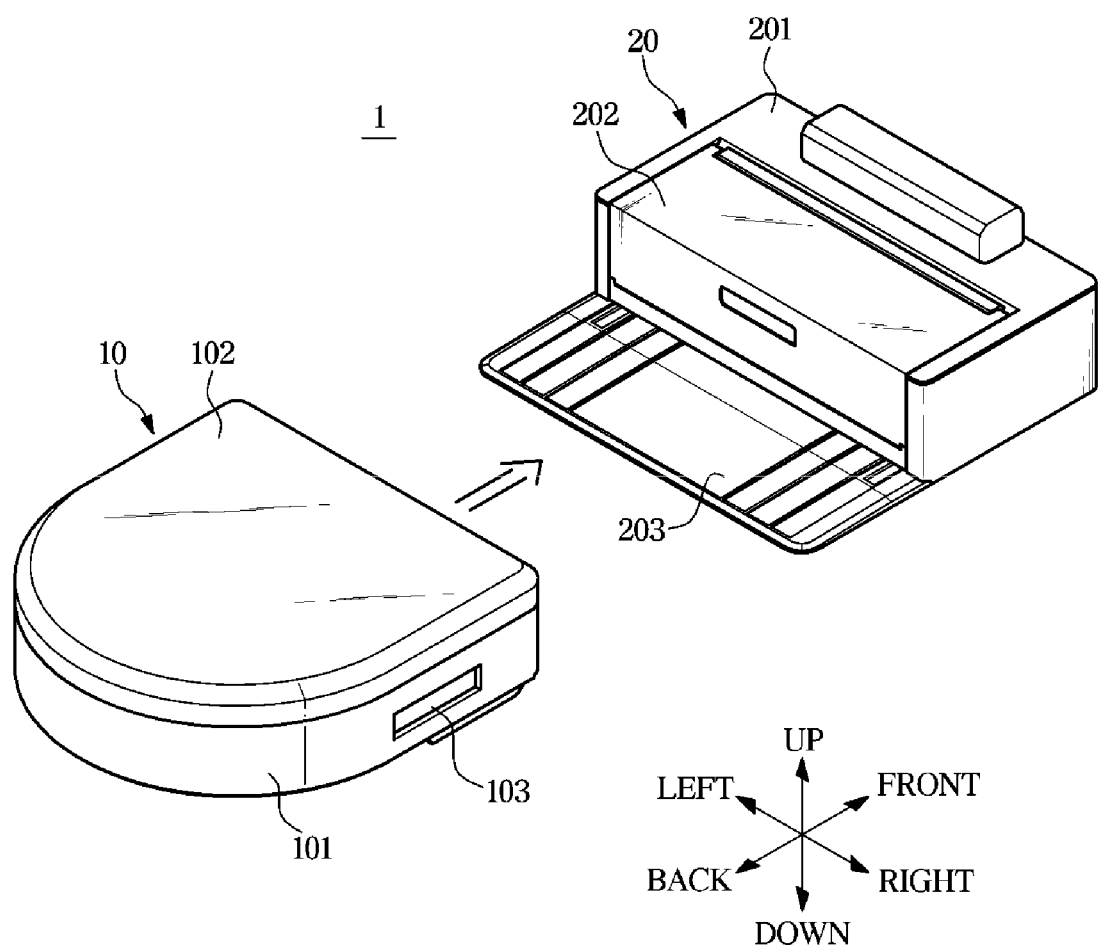
FIG. 1 shows a state in which a robot cleaner of a cleaning system is spaced from a station according to an embodiment of the disclosure.

More specifically, as shown in FIG. 1, a traveling direction of a robot cleaner 10 is defined as a front direction, and a rear direction, left and right sides, and up and down sides may be defined based on the front direction.

Hereinafter, embodiments of the disclosure will be described in detail with reference to the accompanying drawings.

FIG. 1 shows a state in which a robot cleaner of a cleaning system is spaced from a station according to an embodiment of the disclosure.

Figure 2:
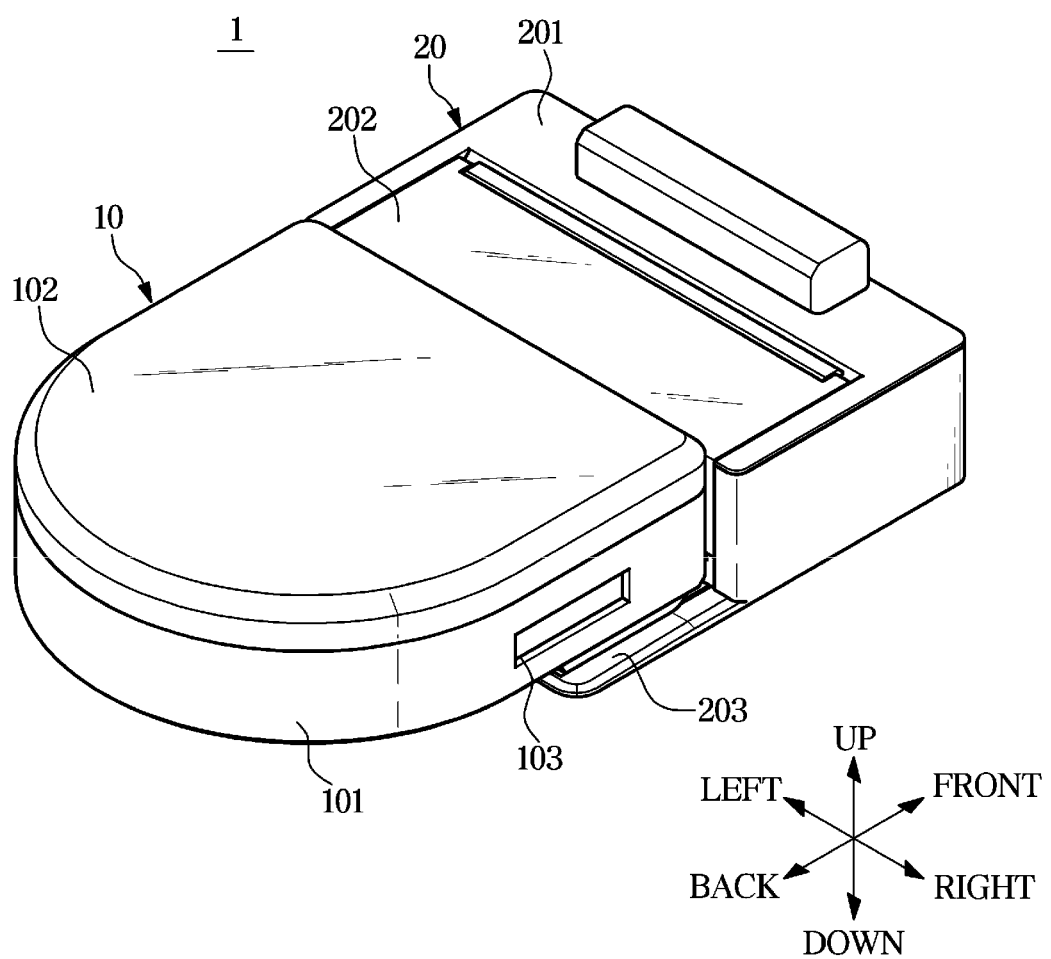
FIG. 2 shows a state in which the robot cleaner shown in FIG. 1 is positioned at a station according to an embodiment of the disclosure.

FIG. 2 shows a state in which the robot cleaner shown in FIG. 1 is positioned at a station according to an embodiment of the disclosure.

Figure 3:
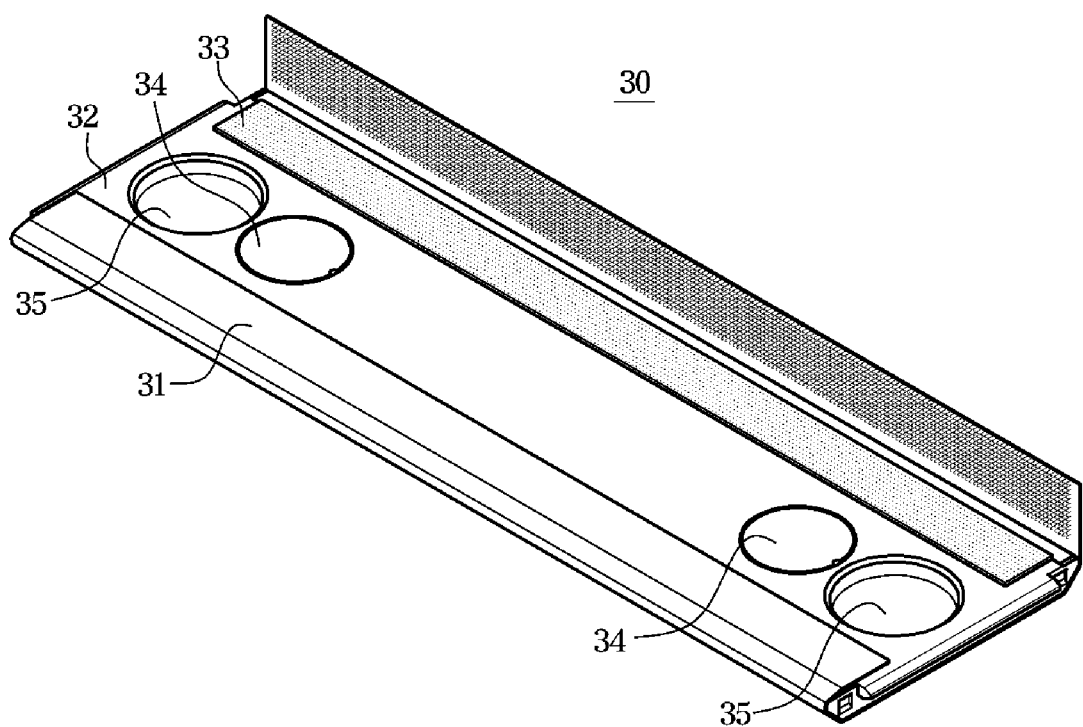
FIG. 3 shows a cleaning pad that is mounted on the robot cleaner shown in FIG. 1 or stored in the station shown in FIG. 1 according to an embodiment of the disclosure.

FIG. 3 shows a cleaning pad that is mounted on the robot cleaner shown in FIG. 1 or stored in the station shown in FIG. 1 according to an embodiment of the disclosure.

Referring to FIGS. 1 to 3, a cleaning system 1 may include a robot cleaner 10 that travels on a cleaning area to clean the cleaning area, and a station 20 configured to supply a cleaning pad 30 to the robot cleaner 10.

The robot cleaner 10 may include a cleaner housing 101 forming an accommodating space therein, and a cleaner cover 102 covering an open, upper side of the cleaner housing 101. In an outer side surface of the cleaner housing 101, a cleaner handle 103 for enabling a user to grip the robot cleaner 10 may be provided.

The station 20 may include a station housing 201 forming an accommodating space therein, a pad storage box 202 positioned in the station housing 201, and a pad coupling part 203 where the robot cleaner 10 replaces a cleaning pad 30 with a new one.

In the pad storage box 202, an extra cleaning pad 30 that is to be provided to the robot cleaner 10 may be stored.

The cleaning pad 30 may include a cleaning tissue 31 contacting a floor to clean the floor, and a pad body 32 on which the cleaning tissue 31 is fixed. The cleaning tissue 31 may clean the floor in a wet or dry state.

In the pad body 32, a tissue fixing part 33 may be provided to fix the cleaning tissue 31. More specifically, the tissue fixing part 33 may enable the cleaning tissue 31 to be detachably mounted on the pad body 32 in a Velcro type.

In the pad body 32, a cleaner coupling part 34 may be formed to be coupled to the robot cleaner 10. More specifically, the cleaner coupling part 34 may include a magnetic body to be coupled to a fixing member 142 provided in the robot cleaner 10 by a magnetic force. Meanwhile, the cleaner coupling part 34 may include an electromagnet to have a magnetic force as necessary.

In the pad body 32, a coupling groove 35 may be formed in which a coupling protrusion 143 of the robot cleaner 10 is inserted. When the cleaning pad 30 is mounted on the robot cleaner 10, the coupling protrusion 143 may be inserted in the coupling groove 35. Due to coupling of the coupling protrusion 143 with the coupling groove 35, the cleaning pad 30 may be prevented from being detached from the robot cleaner 10 by friction with the floor when the robot cleaner 10 travels horizontally. That is, the coupling protrusion 143 and the coupling groove 35 may prevent the cleaning pad 30 from being detached from the robot cleaner 10, even when a magnetic force generated between the cleaner coupling part 34 and the fixing member 142 is smaller than a friction force generated between the cleaning tissue 31 and the floor.

When the cleaning pad 30 needs to be replaced with a new one during cleaning, the robot cleaner 10 may move to the station 20 to be positioned at the pad coupling part 203.

Figure 4:
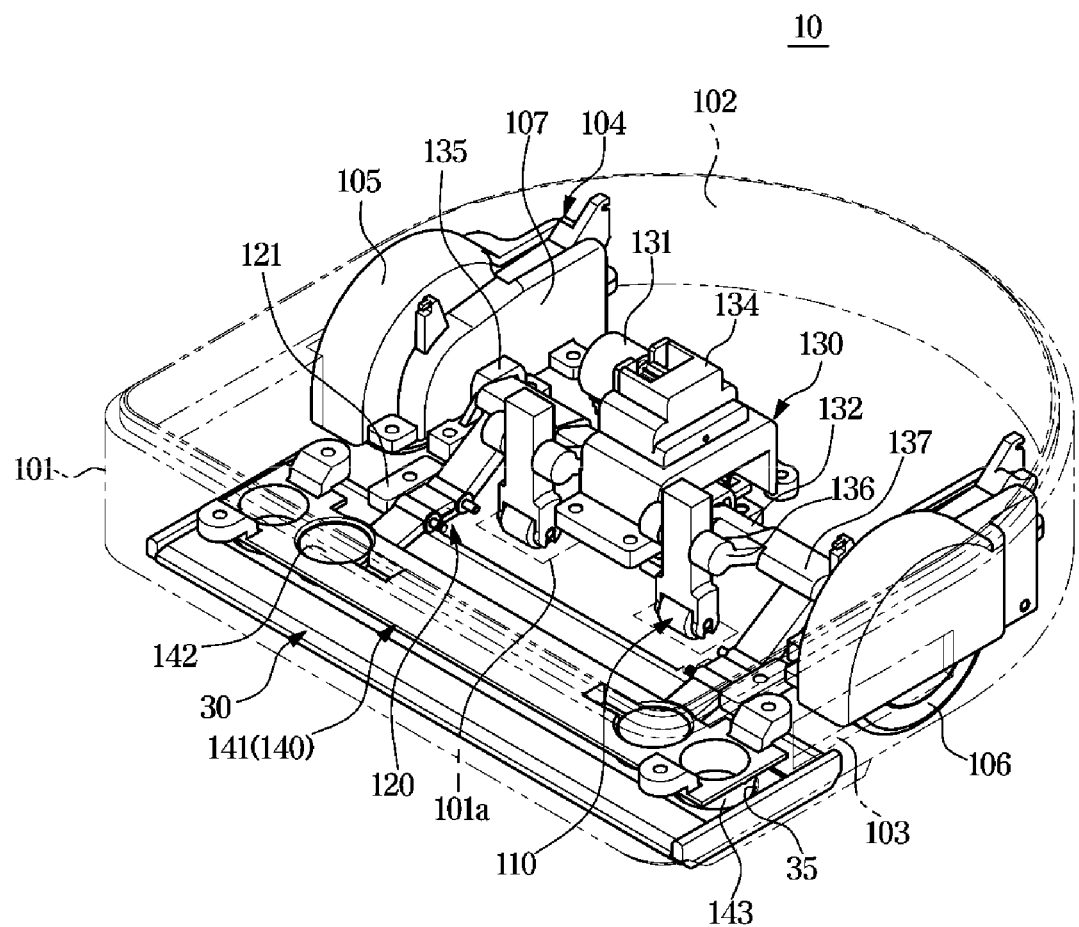
FIG. 4 shows an inside of the robot cleaner shown in FIG. 1 according to an embodiment of the disclosure.

FIG. 4 shows an inside of the robot cleaner shown in FIG. 1 according to an embodiment of the disclosure.

Figure 5:
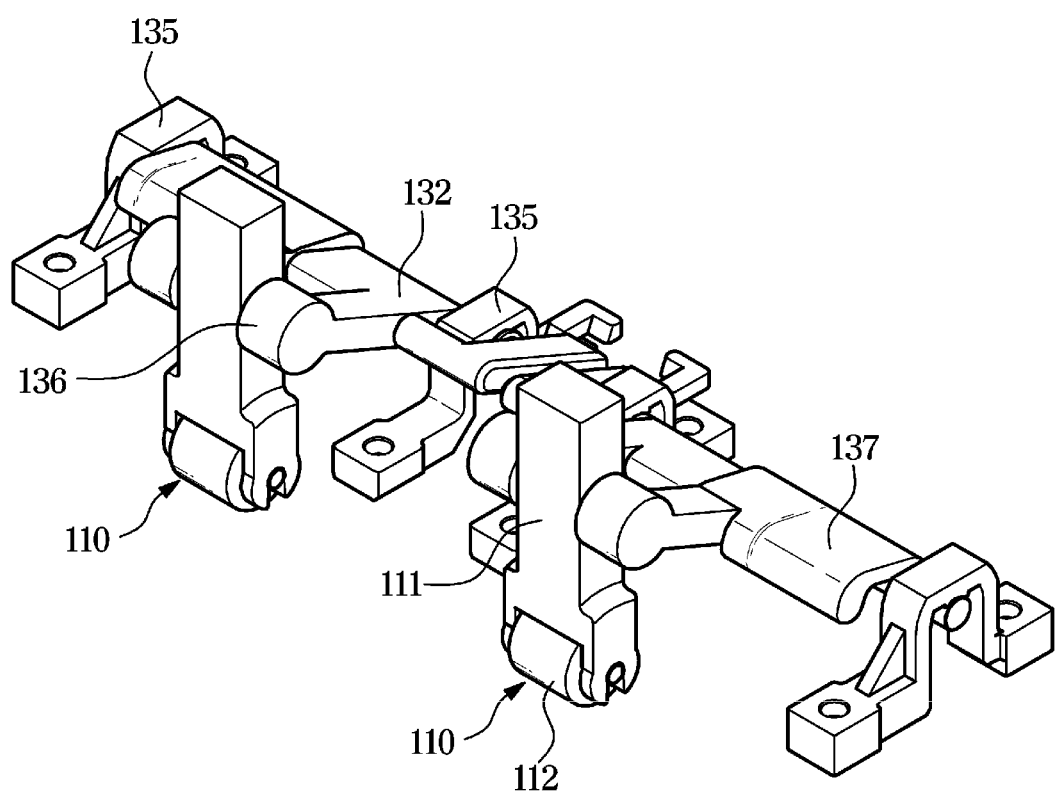
FIG. 5 shows a lifter and a link actuator of the robot cleaner shown in FIG. 4 according to an embodiment of the disclosure.

FIG. 5 shows a lifter and a link actuator of the robot cleaner shown in FIG. 4 according to an embodiment of the disclosure.

Figure 6:
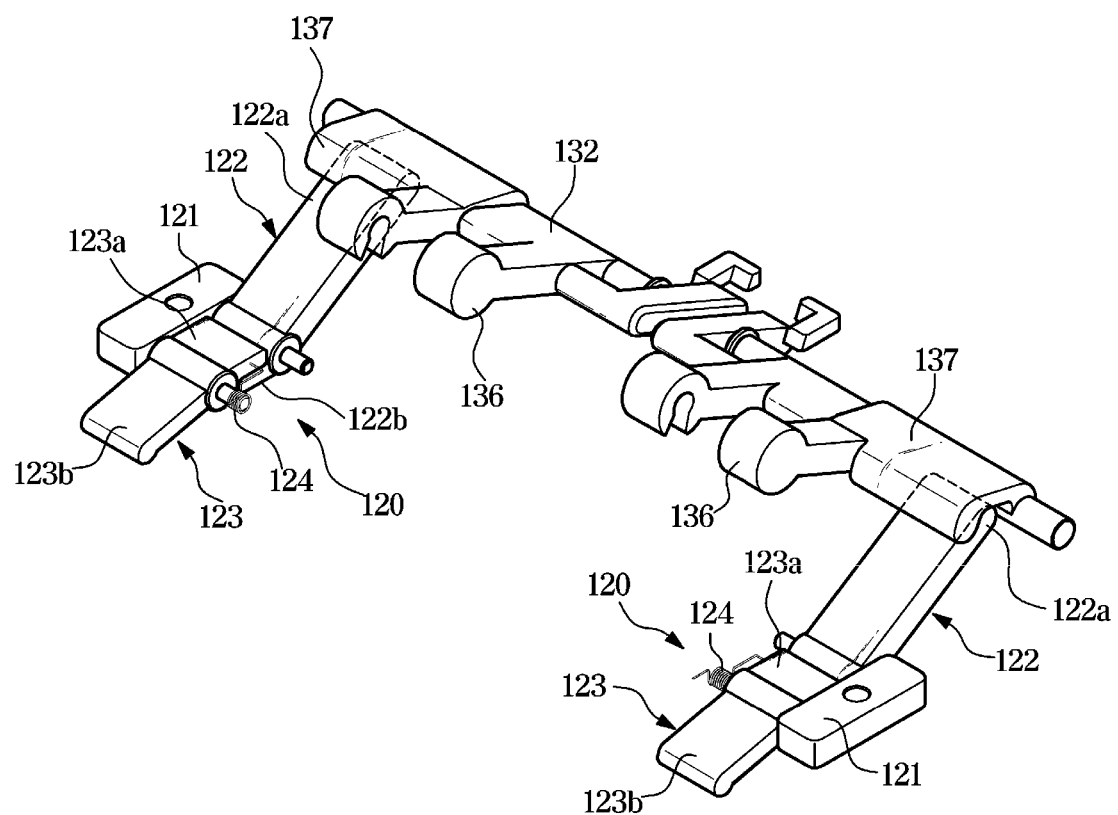
FIG. 6 shows a pad detacher and a link actuator of the robot cleaner shown in FIG. 4 according to an embodiment of the disclosure.

FIG. 6 shows a pad detacher and a link actuator of the robot cleaner shown in FIG. 4 according to an embodiment of the disclosure.

Figure 7:
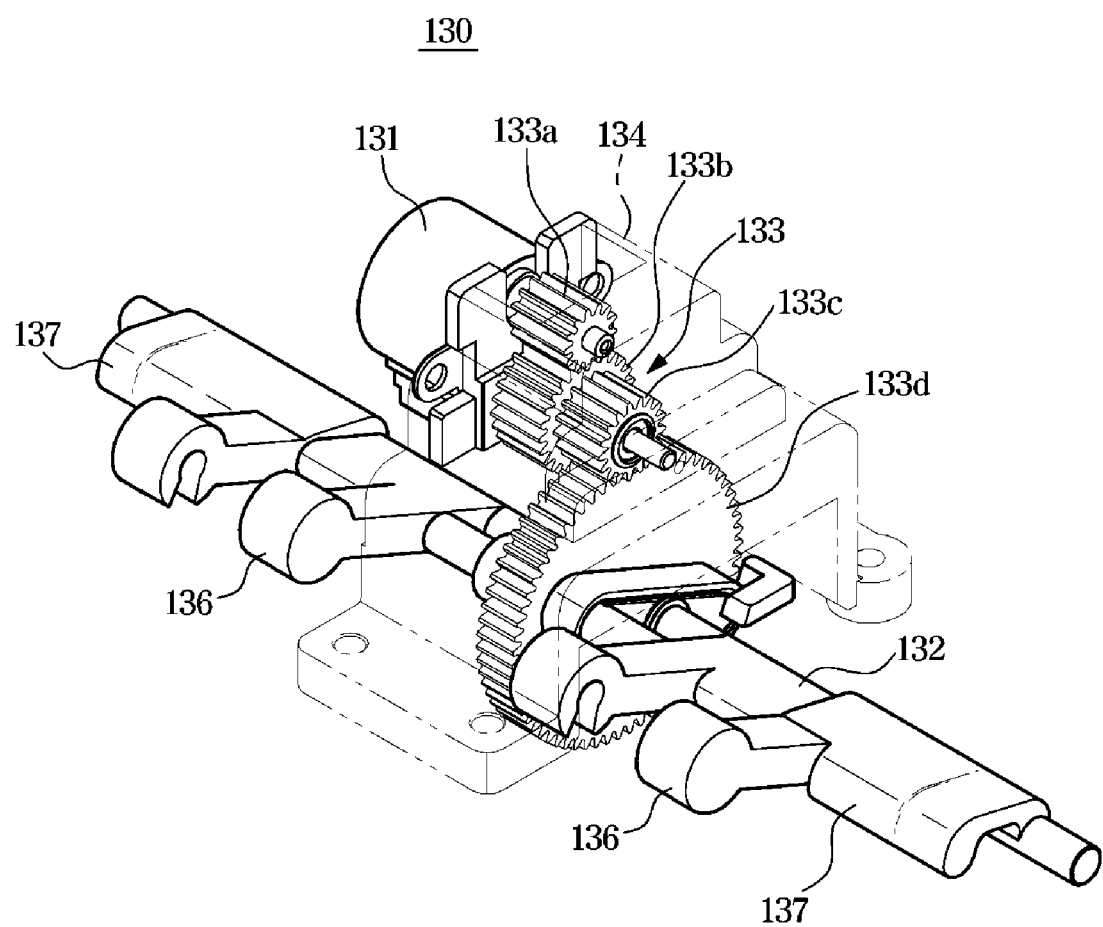
FIG. 7 shows a cleaner driver of the robot cleaner shown in FIG. 4 according to an embodiment of the disclosure.

FIG. 7 shows a cleaner driver of the robot cleaner shown in FIG. 4 according to an embodiment of the disclosure.

Referring to FIGS. 4-7, the robot cleaner 10 may include a moving device 104. The moving device 104 may move the robot cleaner 10. The moving device 104 may include a wheel case 105 fixed inside the cleaner housing 101, a wheel 106 rotatably installed in the wheel case 105, and a wheel driving device 107 for providing power for driving the wheel 106. In FIG. 4, two driving devices 107 are positioned at left and right sides of the robot cleaner 10. However, an arrangement of the moving device 104 is not limited to this.

The wheel driving device 107 may include a wheel driving source (not shown) for generating power, and a wheel power transfer member (not shown) for transferring the power generated by the wheel driving source to the wheel 106.

The robot cleaner 10 may include a lifter 110 configured to lift a part of the robot cleaner 10 at which a pad fixing part 140 is positioned, a pad detacher 120 configured to detach the cleaning pad 30 from the robot cleaner 10, a cleaner driver 130 configured to drive the lifter 110 and the pad detacher 120, and the pad fixing part 140 on which the cleaning pad 30 is detachably mounted.

The lifter 110 may lift a part of the robot cleaner 10 when the cleaning pad 30 is fixed to the pad fixing part 140 or detached from the pad fixing part 140. The lifter 110 may be connected with a link actuator 132 of the cleaner driver 130. A plurality of lifters 110 may be provided.

The lifter 110 may include a lift body 111 rotatably connected with a lift connector 136 of the link actuator 132, and a lift roller 112 rotatably coupled to the lift body 111.

The lift body 111 may move in an up-down direction when the link actuator 132 rotates. The lift body 111 may be guided by a lift guide 101a formed on a bottom of the cleaner housing 101 to move in the up-down direction.

The lift roller 112 may be rotatably coupled to a lower end of the lift body 111. When the lifter 110 moves downward to lift the robot cleaner 10, the lift roller 112 may contact the floor and support a part of the robot cleaner 10. When a part of the robot cleaner 10 is lifted, the robot cleaner 10 may move by a predetermined distance by the lift roller 112.

The pad detacher 120 may detach the cleaning pad 30 mounted on the pad fixing part 140 from the pad fixing part 140. The pad detacher 120 may include a detacher holder 121 fixed to the cleaner housing 101, a detacher link 122 pressed by the link actuator 132 and being rotatable, and a detacher 123 pressed by the detacher link 122 and being rotatable.

The detacher holder 121 may rotatably support the detacher link 122 and the detacher 123 while being fixed to the cleaner housing 101.

The detacher link 122 may be rotatably coupled to the detacher holder 121. One end 122a of the detacher link 122 may be pressed by the link actuator 132. The one end 122a of the detacher link 122 may extend toward the link actuator 132. The other end 122b of the detacher link 122 may press the detacher 123 or be pressed by the detacher 123. The other end 122b of the detacher link 122 may extend toward the detacher 123.

The detacher 123 may be rotatably coupled to the detacher holder 121. One end 123a of the detacher 123 may be pressed by the detacher link 122 or press the detacher link 122. The one end 123a of the detacher 123 may extend toward the detacher link 122. The other end 123b of the detacher 123 may press the cleaning pad 30 in a direction in which the cleaning pad 30 is detached from the pad fixing part 140. The other end 123b of the detacher 123 may extend toward the pad fixing part 140.

The pad detacher 120 may include a detacher elastic member 124. The detacher elastic member 124 may apply an elastic force to the detacher 123 in a direction in which the detacher elastic member 124 does not press the cleaning pad 30 mounted on the pad fixing part 140. When the detacher link 122 is not pressed by the link actuator 132, the detacher elastic member 124 may apply an elastic force to the detacher 123 to return the detacher 123 and the detacher link 122 to their original positions.

The cleaner driver 130 may include a cleaner driving source 131, a link actuator 132 connected with the lifter 110 and the pad detacher 120, a cleaner power transfer member 133 for transferring power generated by the cleaner driving source 131 to the link actuator 132, and a cleaner driver cover 134 covering the cleaner power transfer member 133.

The cleaner driving source 131 may include a motor. The cleaner driving source 131 may generate power for driving the link actuator 132. The motor of the cleaner driving source 131 may be rotatable forward and backward.

The link actuator 132 may transfer power generated by the cleaner driving source 131 to the lifter 110 and the pad detacher 120. The link actuator 132 may be rotatably fixed to the cleaner housing 101. More specifically, the link actuator 132 may be rotatably coupled to the cleaner housing 101 by at least one link holder 135.

The link actuator 132 may include the lift connector 136 connected with the lifter 110. The lift connector 136 may transfer a rotational force of the link actuator 132 to the lifter 110. The lift connector 136 may rotatably support the lifter 110. When the link actuator 132 rotates, the lifter 110 may move in the up-down direction.

The link actuator 132 may include a link pressing part 137 interfering with the pad detacher 120. The link pressing part 137 may protrude to press the detacher link 122 of the pad detacher 120 when the link actuator 132 rotates. The link pressing part 137 may transfer a rotational force of the link actuator 132 to the detacher link 122.

The cleaner power transfer member 133 may include a plurality of gears 133a, 133b, 133c and 133d. The cleaner power transfer member 133 may include a first gear 133a, a second gear 133b, a third gear 133c and a fourth gear 133d to adjust a gear ratio to control a rotation speed of the link actuator 132. However, the number of gears included in the cleaner power transfer member 133 is not limited to this, and a different number of gears may be provided as necessary. The cleaner power transfer member 133 may connect the link actuator 132 with the cleaner driving source 131.

The cleaner driver cover 134 may be fixed to the cleaner housing 101. The cleaner driver cover 134 may protect the cleaner power transfer member 133 against foreign materials.

The cleaner driver 130 may include the link holder 135 for rotatably fixing the link actuator 132 at the cleaner housing 101. The link holder 135 may rotatably support the link actuator 132.

The pad fixing part 140 may be positioned at a front end of the robot cleaner 10. The pad fixing part 140 may include a fixing body 141 extending in a left-right direction, and the fixing member 142 coupled to the cleaner coupling part 34 of the cleaning pad 30.

The fixing body 141 may extend along the front end of the robot cleaner 10. The fixing body 141 may extend in the same direction in which the cleaning pad 30 extends. The fixing body 141 may be fixed to the cleaner housing 101.

The fixing member 142 may be positioned in the fixing body 141. The fixing member 142 may include a magnet. Accordingly, the pad fixing part 140 may fix the cleaning pad 30 by a magnetic force. Meanwhile, the fixing member 142 may include an electromagnet to have a magnetic force as necessary.

Figure 8:
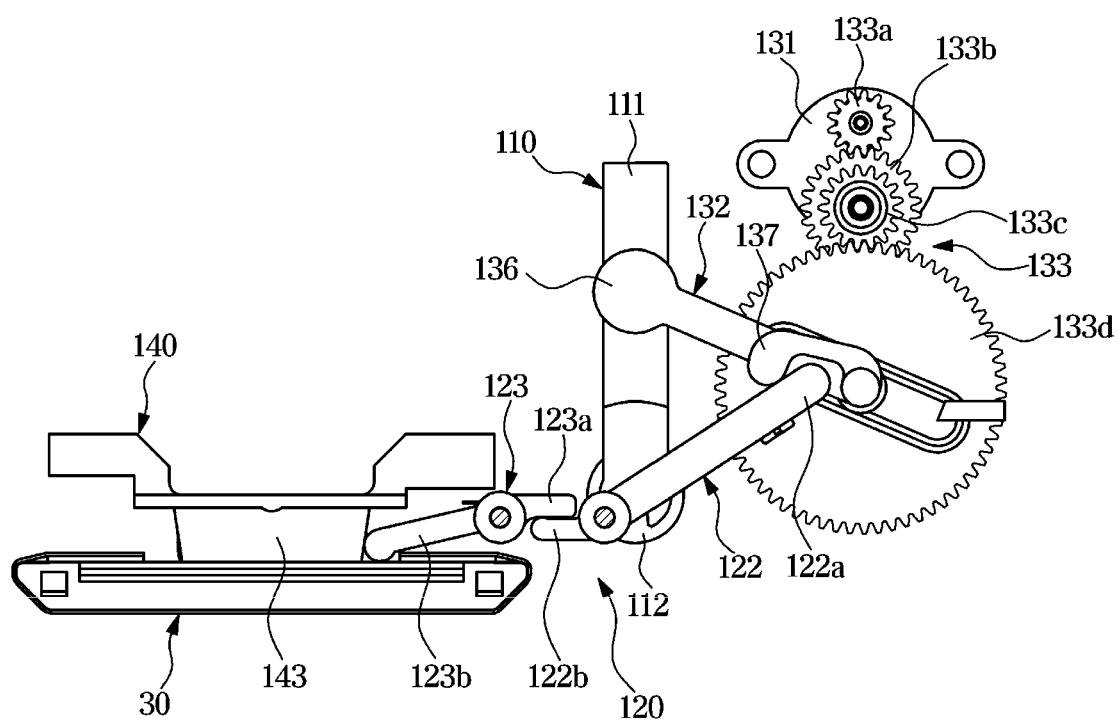
FIG. 8 schematically shows a state in which a cleaning pad is mounted on the robot cleaner shown in FIG. 4 according to an embodiment of the disclosure.

FIG. 8 shows a state in which a cleaning pad is mounted on the robot cleaner shown in FIG. 4 according to an embodiment of the disclosure.

Figure 9:
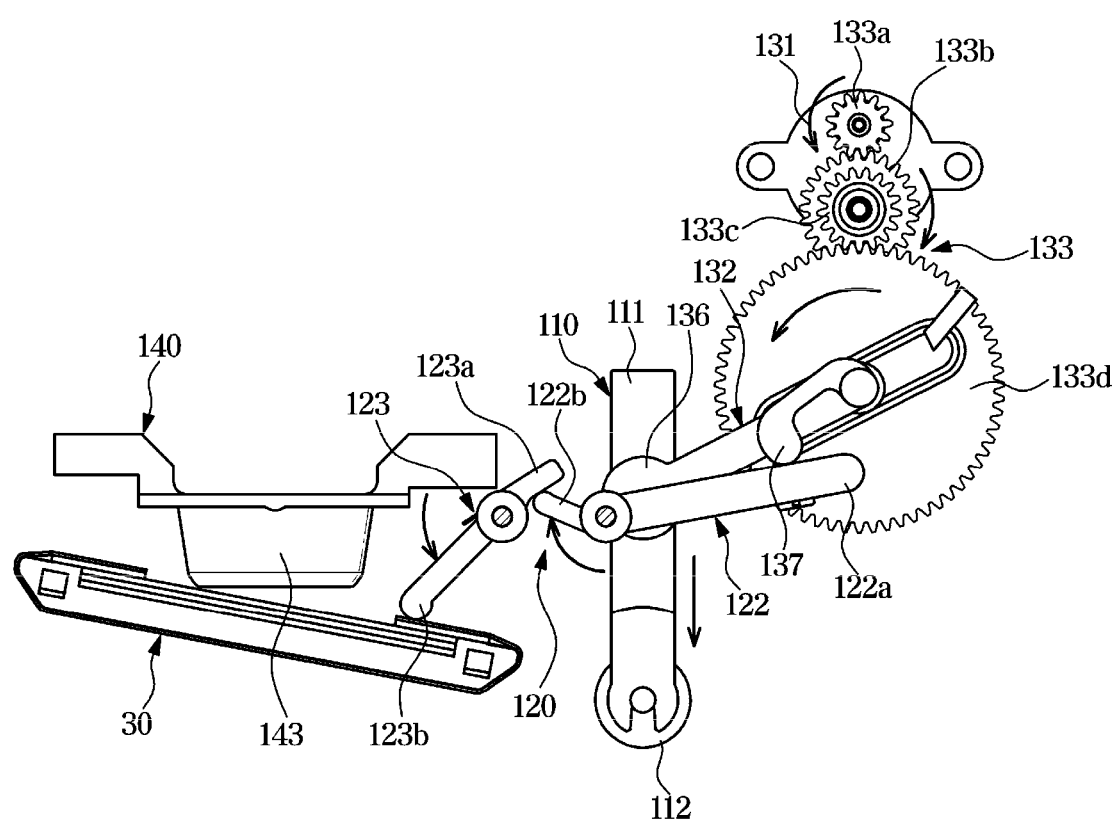
FIG. 9 schematically shows a state in which a cleaning pad is detached from the robot cleaner shown in FIG. 4 according to an embodiment of the disclosure.

FIG. 9 shows a state in which a cleaning pad is detached from the robot cleaner shown in FIG. 4 according to an embodiment of the disclosure.

Referring to FIG. 8, the robot cleaner 10 may clean the floor with the cleaning pad 30 fixed to the pad fixing part 140. When a degree of contamination of the cleaning pad 30 is higher than a reference value, the robot cleaner 10 may detach the cleaning pad 30 from the pad fixing part 140 to receive a new cleaning pad 30.

Referring to FIG. 9, power generated by the cleaner driving source 131 may be transferred to the link actuator 132 by the cleaner power transfer member 133. When the link actuator 132 receives the power and rotates in a first direction (a counterclockwise direction in FIGS. 8 and 9), the lifter 110 may move downward. When the lifter 110 moves downward, a part of the robot cleaner 10 in which the pad fixing part 140 is positioned may be lifted.

When the link actuator 132 rotates in the first direction, the detacher link 122 of the pad detacher 120 may be pressed by the link pressing part 137 of the link actuator 132 to rotate in a second direction (a clockwise direction in FIGS. 8 and 9) that is opposite to the first direction. When the detacher link 122 rotates in the second direction, the detacher 123 may rotate in the first direction. When the detacher 123 rotates in the first direction, the other end 123b of the detacher 123 may press a part of the cleaning pad 30 in a direction in which the cleaning pad 30 is detached from the pad fixing part 140. A pressing force applied by the detacher 123 may be set to be greater than a magnetic force between the pad fixing part 140 and the cleaning pad 30. The detacher 123 may be at a position at which the detacher 123 is able to detach the cleaning pad 30 from the pad fixing part 140.

After the cleaning pad 30 is detached, the link actuator 132 may rotate in the second direction by the cleaner driving source 131 and the cleaner power transfer member 133. Accordingly, the lifter 110 may move upward, and the part of the robot cleaner 10 in which the pad fixing part 140 is positioned may fall.

When the link actuator 132 rotates in the second direction, the one end 122a of the detacher link 122 may be released from the pressure applied by the link actuator 132. Because the detacher elastic member 124 applies an elastic force to rotate the detacher 123 in the second direction, the detacher 123 may rotate in the second direction. Accordingly, the detacher link 122 may rotate in the first direction, and the cleaner robot 10 may become a state shown in FIG. 8.

Figure 10:
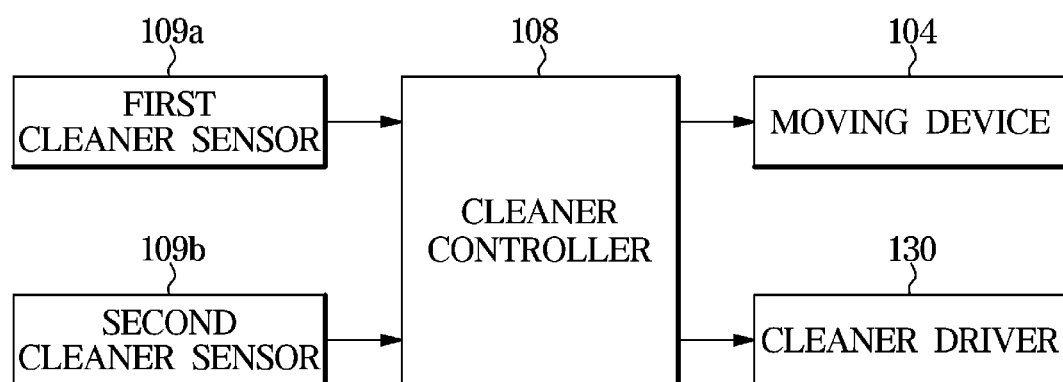
FIG. 10 is a control block diagram of the robot cleaner shown in FIG. 4 according to an embodiment of the disclosure.

FIG. 10 is a control block diagram of the robot cleaner shown in FIG. 4 according to an embodiment of the disclosure.

Referring to FIG. 10, the robot cleaner 10 may include a cleaner controller 108, a first cleaner sensor 109a, and a second cleaner sensor 109b.

The cleaner controller 108 may receive information from the first cleaner sensor 109a and the second cleaner sensor 109b, and drive the moving device 104 and the cleaner driver 130 as necessary. The cleaner controller 108 may be a microcomputer (e.g., at least one processor).

The first cleaner sensor 109a may acquire information required for movements of the robot cleaner 10. The first cleaner sensor 109a may be a distance sensor or an infrared sensor for measuring distances between the robot cleaner 10 and surrounding objects. The first cleaner sensor 109a may transfer the acquired information to the cleaner controller 108.

The second cleaner sensor 109b may measure a degree of contamination of the cleaning pad 30 mounted on the robot cleaner 10. The second cleaner sensor 109b may be positioned at the pad fixing part 140 to measure a degree of contamination of the cleaning pad 30. The second cleaner sensor 109b may transfer the acquired information to the cleaner controller 108. The cleaner controller 108 may receive the information, and drive the moving device 104 and the cleaner driver 130 to perform a task of detaching the cleaning pad 30 from the pad fixing part 140.

In contrast, the second cleaner sensor 109b may measure a cleaning time of the robot cleaner 10. When the cleaning time of the robot cleaner 10 elapses a predetermined cleaning time, the second cleaner sensor 109b may transfer information indicating that the cleaning time of the robot cleaner 10 elapses the predetermined cleaning time to the cleaner controller 108. The cleaner controller 108 may receive the information, and drive the moving device 104 and the cleaner driver 130 to perform a task of detaching the cleaning pad 30 from the pad fixing part 140.

Figure 11:
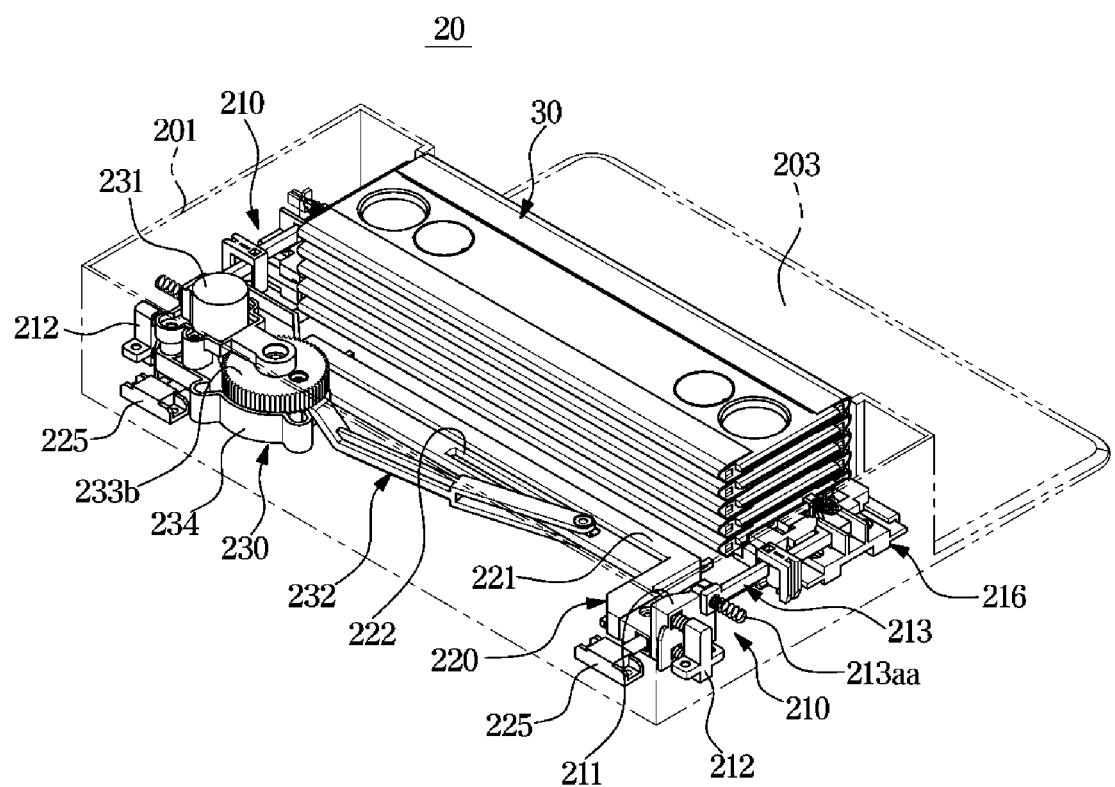
FIG. 11 shows an inside of the station shown in FIG. 1 according to an embodiment of the disclosure.

FIG. 11 shows an inside of the station shown in FIG. 1 according to an embodiment of the disclosure.

Figure 12:
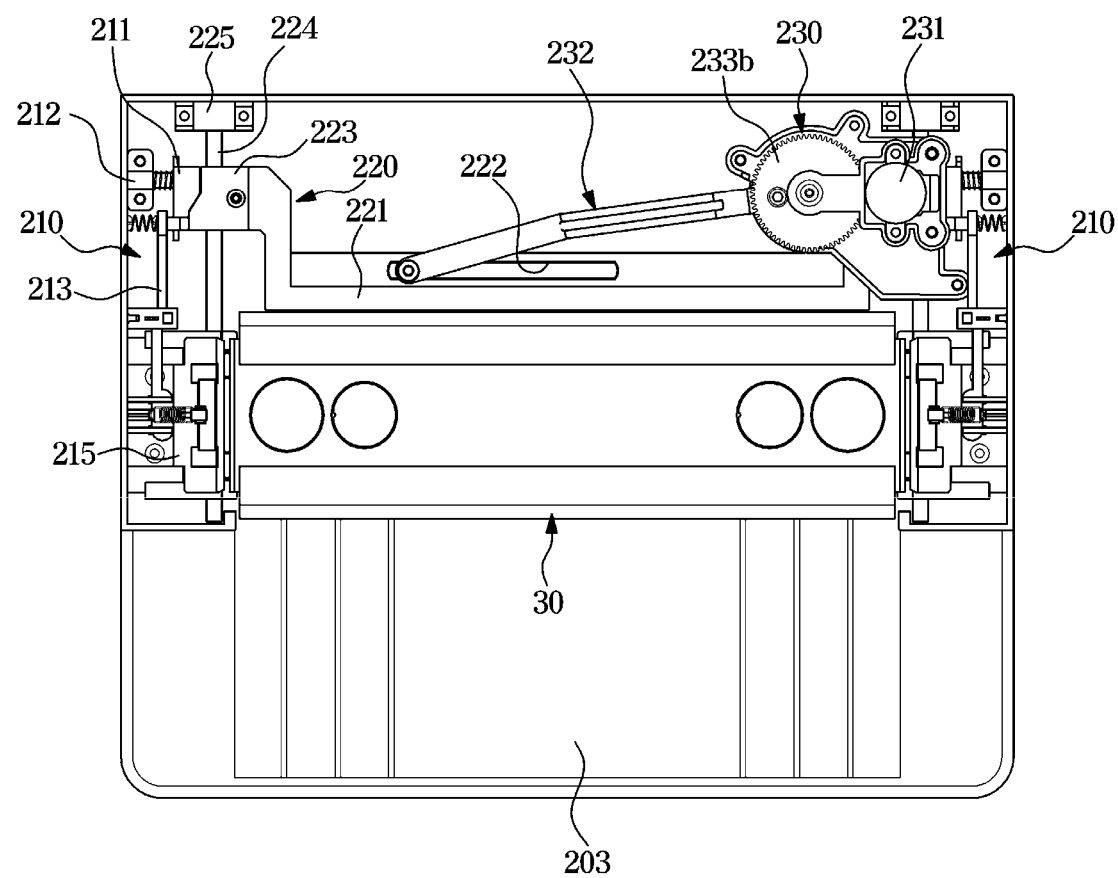
FIG. 12 is a top view showing an inside of the station shown in FIG. 11 according to an embodiment of the disclosure.

FIG. 12 is a top view showing the inside of the station shown in FIG. 11 according to an embodiment of the disclosure.

Figure 13:
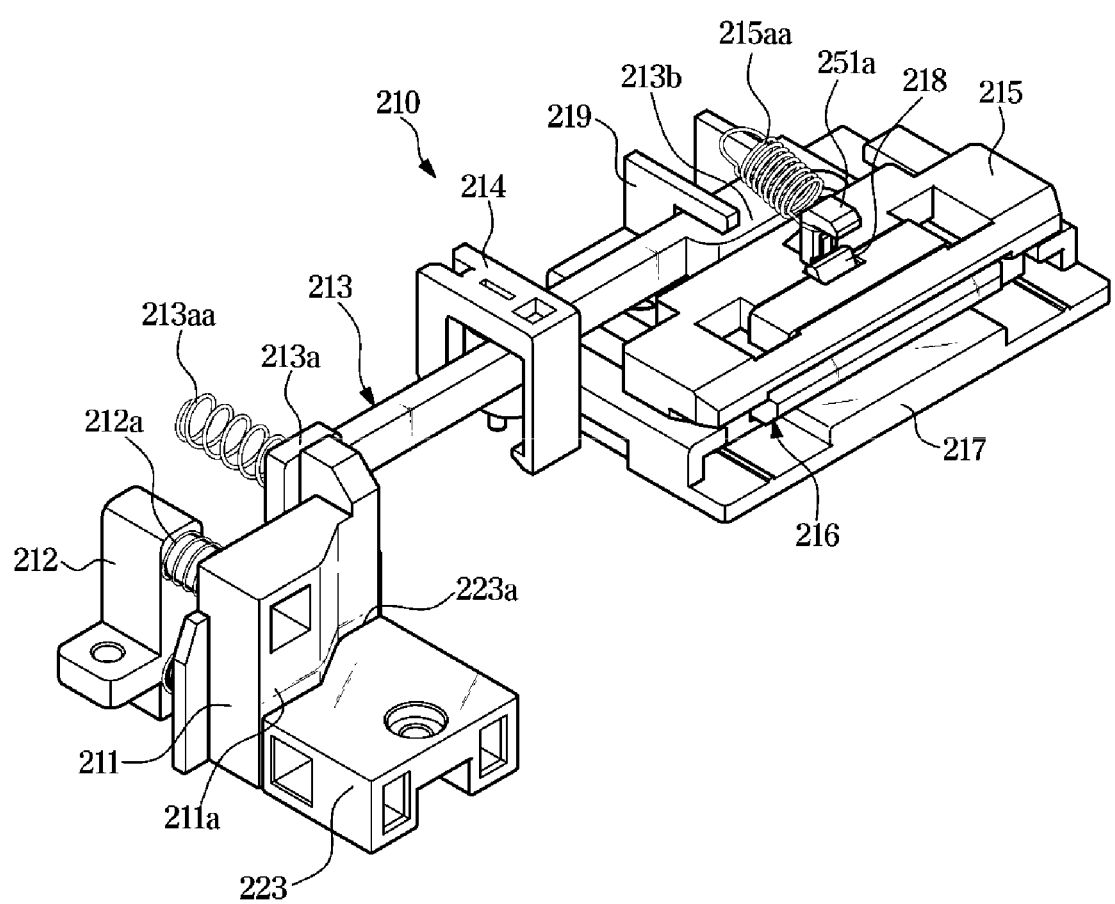
FIG. 13 shows a separating and supplying device shown in FIGS. 11 and 12 according to an embodiment of the disclosure.

FIG. 13 shows a separating and supplying device shown in FIGS. 11 and 12 according to an embodiment of the disclosure.

Figure 14:
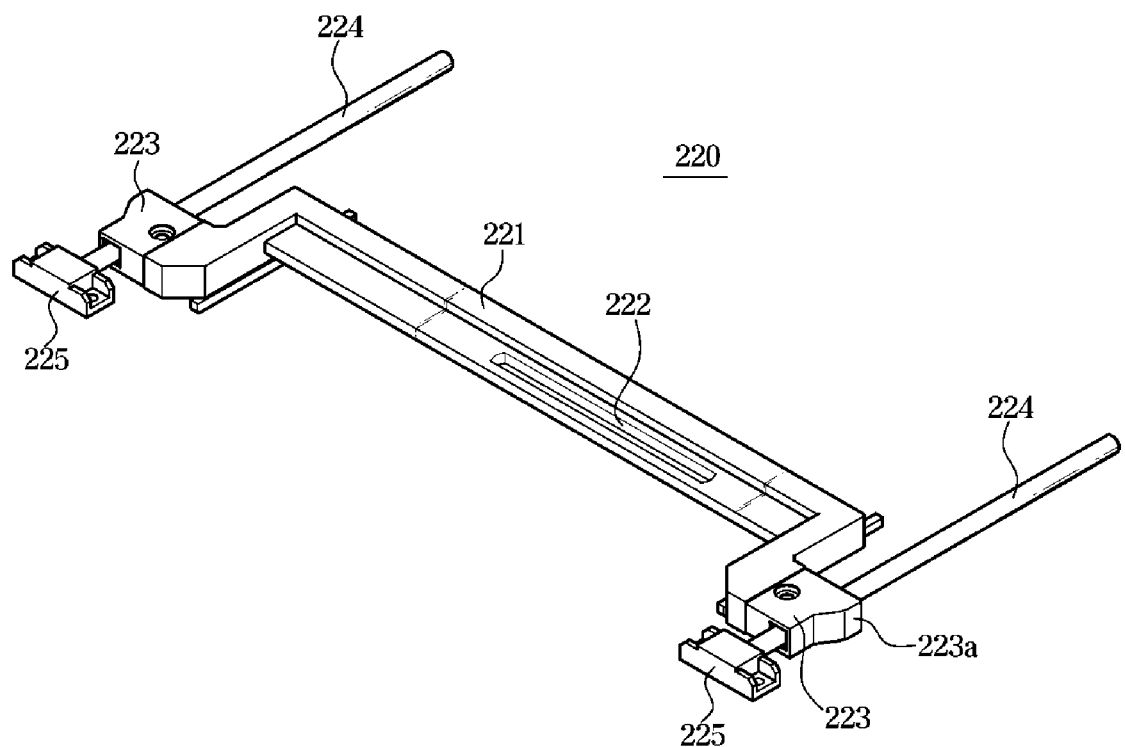
FIG. 14 shows a pad supplier shown in FIGS. 11 and 12 according to an embodiment of the disclosure.

FIG. 14 shows a pad supplier shown in FIGS. 11 and 12 according to an embodiment of the disclosure.

Figure 15:
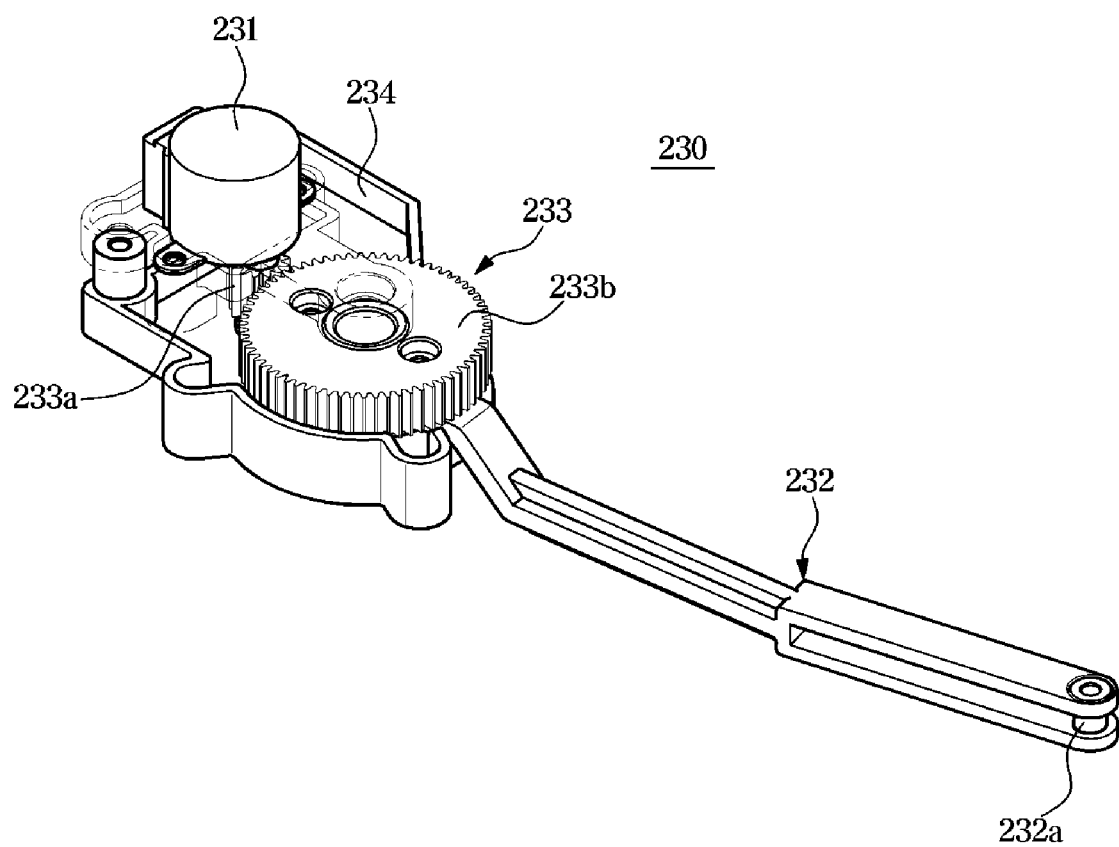
FIG. 15 shows a station driver shown in FIGS. 11 and 12 according to an embodiment of the disclosure.

FIG. 15 shows a station driver shown in FIGS. 11 and 12 according to an embodiment of the disclosure.

Referring to FIGS. 11-14, the station 20 may include a separating and supplying device 210, a pad supplier 220, and a station driver 230, which are positioned inside the station housing 201.

The separating and supplying device 210 may move a cleaning pad 30 among a plurality of cleaning pads 30 stacked in the pad storage box 202 to a position at which a push member 221 is able to push the cleaning pad 30.

Referring to FIG. 13, the separating and supplying device 210 may include a slider link 211, a slider fixing part 212, a pad link 213, a link support 214, a pad separating member 215, a lever body 216, and a pad locker 217.

The slider link 211 may be selectively pressed by a slider 223. The slider link 211 may include a link protrusion 211a protruding to be selectively pressed by a slider protrusion 223a of the slider 223. When the slider link 211 is pressed by the slider 223, the slider link 211 may press one end of the pad link 213.

The slider fixing part 212 may be fixed to the station housing 201. The slider fixing part 212 may support the slider link 211. The slider fixing part 212 may include a link elastic member 212a for applying an elastic force to the slider link 211 toward the slider 223. The slider link 211 may be elastically biased to the slider fixing part 212 in a direction toward the slider 223 by the link elastic member 212a.

The pad link 213 may be rotatably coupled to the link support 214. One end 213a of the pad link 213 may contact the slider link 211, and the other end 213b of the pad link 213 may contact the pad separating member 215.

The one end 213a of the pad link 213 may be supported by a support elastic body 213aa. The support elastic body 213aa may press the one end 213a of the pad link 213 toward the slider 223.

The link support 214 may be fixed to the station housing 201. The link support 214 may rotatably support the pad link 213.

The pad separating member 215 may be pressed by the other end 213b of the pad link 213. When the pad separating member 215 is pressed by the pad link 213, the pad separating member 215 may move to a position of supporting, except for a cleaning pad 30a (see FIG. 16) which is the lowermost one among the plurality of cleaning pads 30 stored in the pad storage box 202, a remaining cleaning pad 30b (see FIG. 16) of the cleaning pads 30. The pad separating member 215 may be coupled to the lever body 216 in such a way to be slidable with respect to the lever body 216.

The pad separating member 215 may include an elastic fixing part 215a connected with a separating elastic member 215aa. The separating elastic member 215aa may apply an elastic force to the pad separating member 215 in a direction in which the pad separating member 215 releases a force supporting the remaining cleaning pad 30b except for the cleaning pad 30a which is the lowermost one among the plurality of cleaning pads 30.

"The lever body 216 may slidingly support the pad separating member 215 and the pad locker 217. The lever body 216 may be fixed to the station housing 201. The lever body 216 may include a rotation restricting part 219 for restricting a rotation range of the pad link 213. The rotation restricting part 219 may support the other end 213b of the pad link 213 in a direction that is opposite to a direction of an elastic force applied to the pad separating member 215 by the separating elastic member 215aa."

When the pad separating member 215 moves to the position of supporting the remaining cleaning pad 30b among the plurality of cleaning pads 30 stored in the pad storage box 202 except for the cleaning pad 30a which is the lowermost one of the cleaning pads 30, the pad locker 217 may move to a position of releasing a force supporting the lowermost cleaning pad 30a. The pad locker 217 may be slidingly coupled to the lever body 216.

The separating and supplying device 210 may include a locking lever 218 connecting the pad separating member 215 with the pad locker 217 such that the pad separating member 215 interworks with the pad locker 217. The locking lever 218 may be rotatably coupled to the lever body 216.

The pad supplier 220 may supply a cleaning pad 30 among the plurality of cleaning pads 30 stored in the pad storage box 202 to the pad coupling part 203.

Referring to FIG. 14, the pad supplier 220 may include a push member 221, a push slit 222, a slider 223, a push shaft 224, and a push fixing part 225.

The push member 221 may move the cleaning pad 30 among the plurality of cleaning pads 30 stored in the pad storage box 202 to the pad coupling part 203 in which the robot cleaner 10 is positioned. The push member 221 may extend along a longitudinal direction of the cleaning pad 30. The push member 221 may be connected with the station driver 230 to move the cleaning pad 30 among the plurality of cleaning pads 30 stored in the pad storage box 202 to the pad coupling part 203.

The push slit 222 may be formed in a part of the push member 221. The push slit 222 may convert a rotational motion of a push link 232 of the station driver 230 into a linear motion of the push member 221. A push insertion part 232a may be slidingly inserted in the push slit 222. The push slit 222 may guide a movement of the push insertion part 232a.

The slider 223 may be positioned at both ends of the push member 221. The slider 223 may selectively press the slider link 211 of the separating and supplying device 210. The slider 223 may include the slider protrusion 223a that protrudes to selectively press the slider link 211. The slider 223 may slidingly move along the push shaft 224.

The push shaft 224 may be slidingly inserted in the slider 223. The push shaft 224 may guide a movement in front-back direction of the push member 221. The push shaft 224 may extend in the front-back direction.

The push fixing part 225 may be fixed to the station housing 201. The push fixing part 225 may fix the push shaft 224.

According to the configuration, the push member 221 may move in the front-back direction when the slider 223 positioned at the both ends moves in the front-back direction along the push shaft 224.

The station driver 230 may drive the pad supplier 220.

Referring to FIG. 15, the station driver 230 may include a station driving source 231, the push link 232, a station power transfer member 233, and a station driver cover 234.

The station driving source 231 may include a motor. The station driving source 231 may generate power for driving the push link 232. The motor of the station driving source 231 may be rotatable forward and backward.

The push link 232 may receive power generated by the station driving source 231 from the station power transfer member 233. One end of the push link 232 may be connected with the station power transfer member 233 to become a center of rotation, and the other end of the push link 232 may be slidingly coupled to the push slit 222. The push insertion part 232a may be positioned at the other end of the push link 232. The push insertion part 232a may move in a state in which the push insertion part 232a is inserted in the push slit 222. The push insertion part 232a may convert a rotational motion of the push link 232 to a linear motion of the push member 221. The push link 232 may be considered as a connection member in that the push link 232 connects the station driving source 231 with the push member 221 together with the station power transfer member 233.

The station power transfer member 233 may include a plurality of gears 233a and 233b. The station power transfer member 233 may include a first gear 233a and a second gear 233b for adjusting a gear ratio to control a rotation speed of the push link 232. However, the number of gears included in the station power transfer member 233 is not limited to this, and a different number of gears may be provided as necessary. The station power transfer member 233 may connect the station driving source 231 with the push link 232.

The station driver cover 234 may be fixed to the station housing 201. The station driver cover 234 may accommodate the station power transfer member 233.

Figure 16:
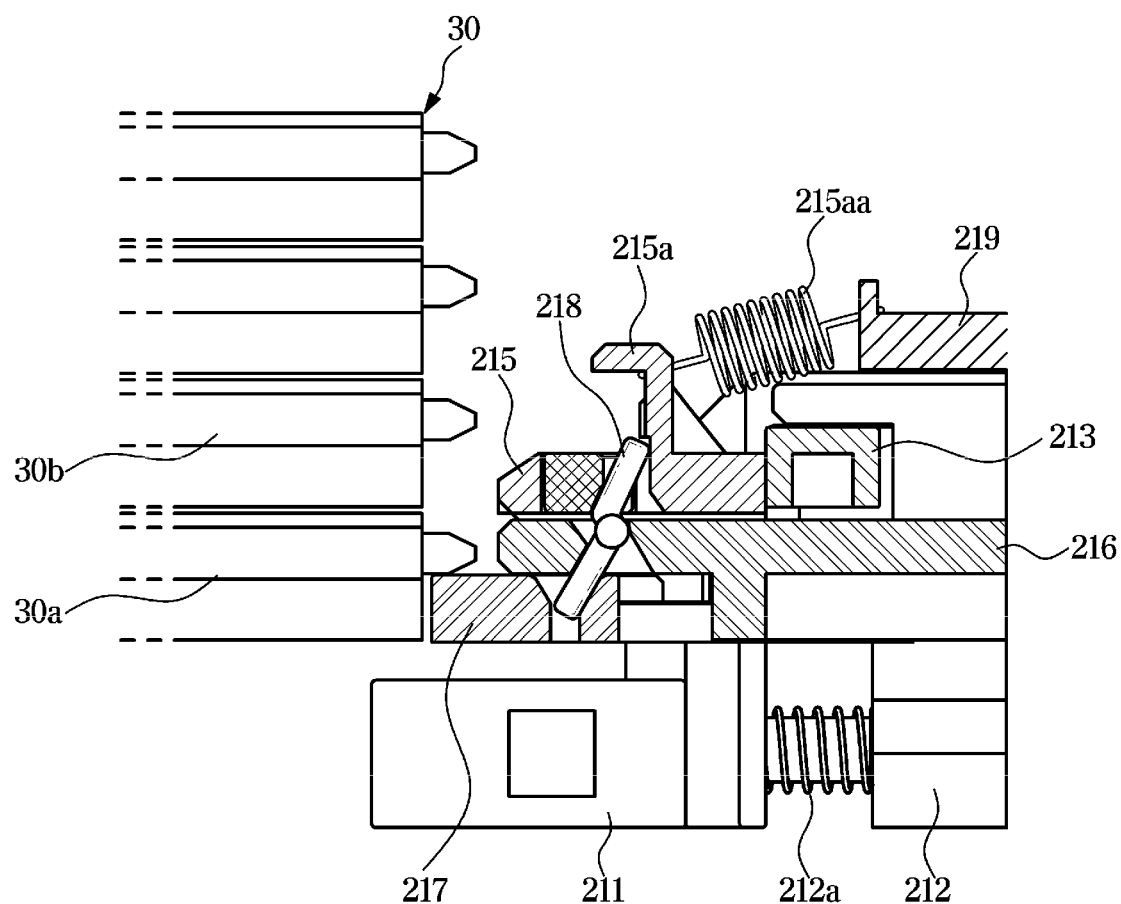
FIG. 16 shows a state before the separating and supplying device shown in FIG. 13 provides a cleaning pad according to an embodiment of the disclosure.

FIG. 16 shows a state before the separating and supplying device shown in FIG. 13 provides a cleaning pad according to an embodiment of the disclosure.

Figure 17:
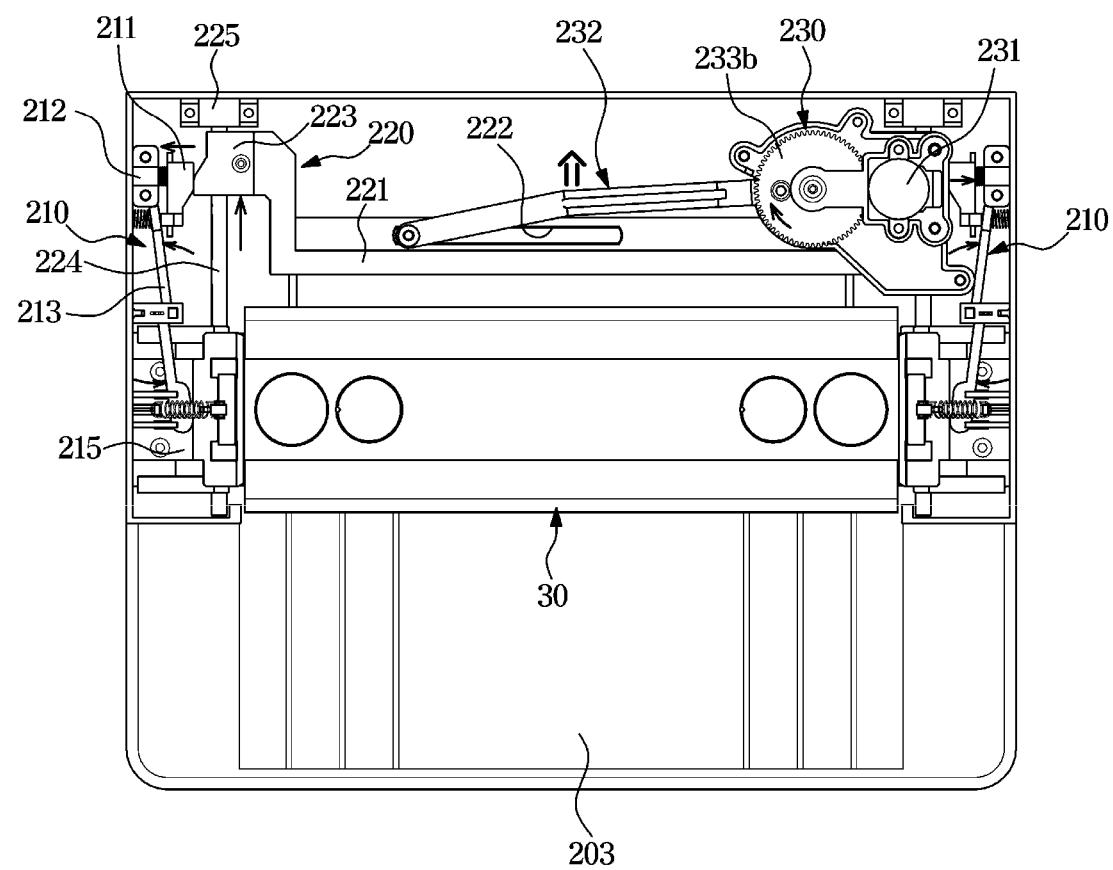
FIG. 17 is a top view showing a state in which the separating and supplying device of the station shown in FIG. 11 provides a cleaning pad among a plurality of cleaning pads to a push position according to an embodiment of the disclosure.

FIG. 17 is a top view showing a state in which the separating and supplying device of the station shown in FIG. 11 provides a cleaning pad among a plurality of cleaning pads to a push position according to an embodiment of the disclosure.

Figure 18:
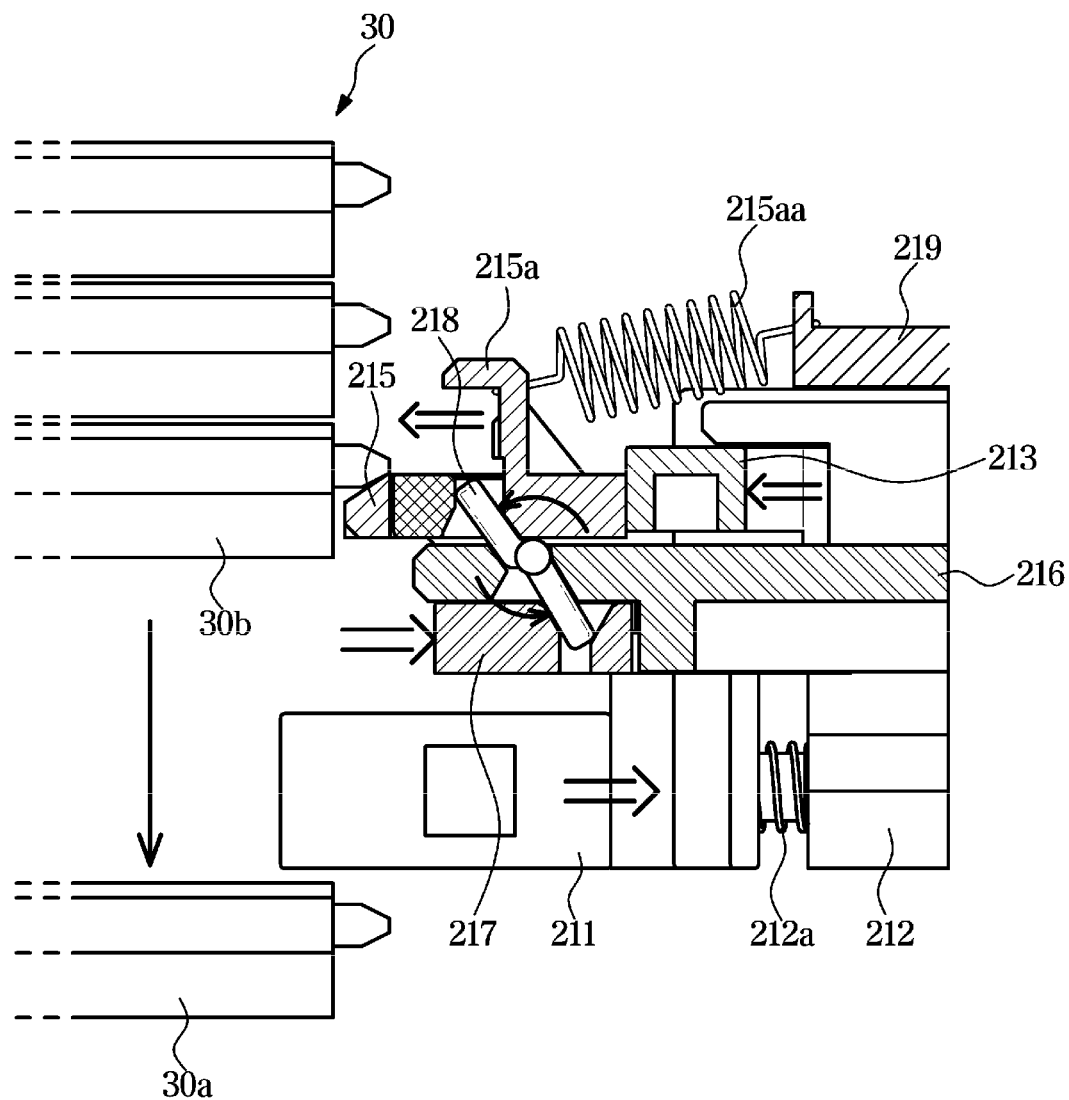
FIG. 18 shows the separating and supplying device and the cleaning pad in the state shown in FIG. 17 according to an embodiment of the disclosure.

FIG. 18 shows the separating and supplying device and the cleaning pad in the state shown in FIG. 17 according to an embodiment of the disclosure.

Figure 19:
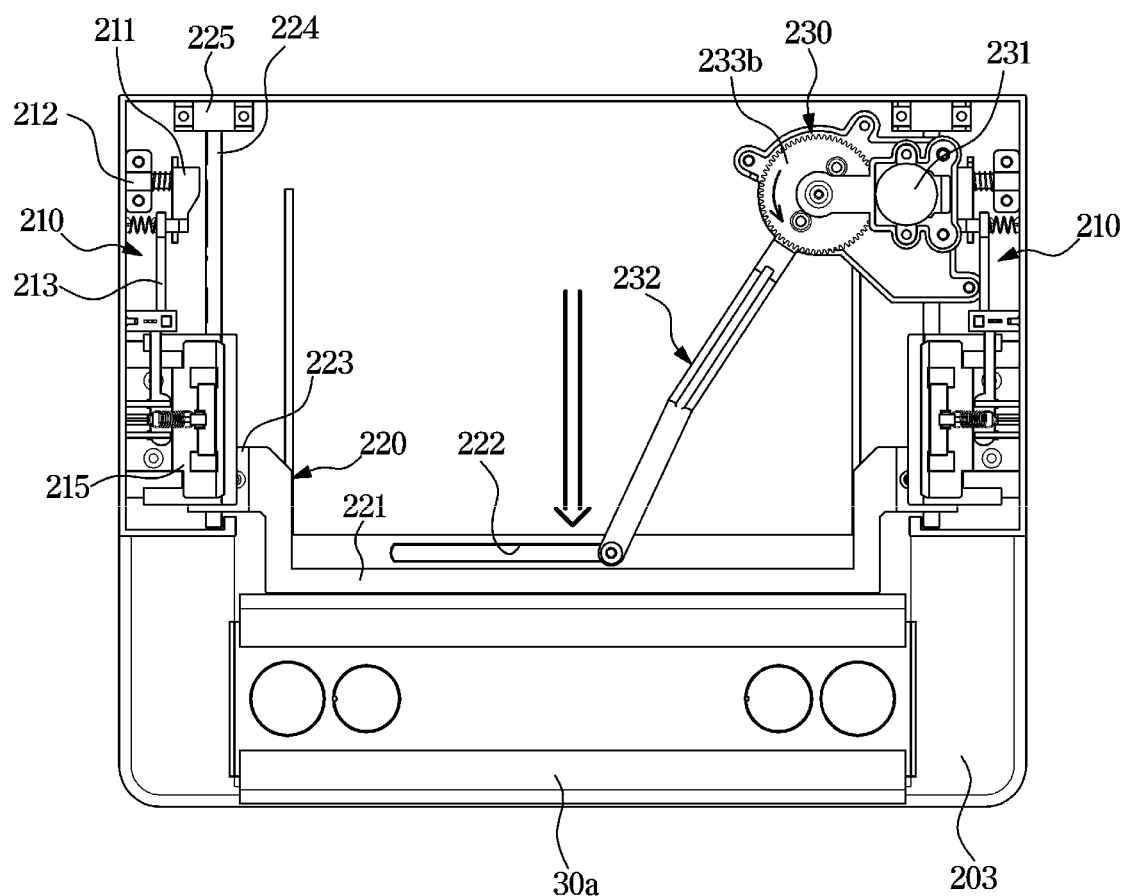
FIG. 19 shows a state in which a pad supplier of the station shown in FIG. 11 moves a cleaning pad to a pad coupling part according to an embodiment of the disclosure.

FIG. 19 shows a state in which a pad supplier of the station shown in FIG. 11 moves a cleaning pad to a pad coupling part according to an embodiment of the disclosure.

Referring to FIG. 16, when the station 20 does not supply a cleaning pad 30 to the robot cleaner 10, the pad locker 217 may support all cleaning pads 30 stored in the pad storage box 202.

Referring to FIGS. 17 and 18, when the robot cleaner 10 is positioned at the pad coupling part 203 of the station 20 to receive a new cleaning pad 30a, the station driver 230 may rotate the push link 232 in a third direction (a clockwise direction in FIG. 3). When the push link 232 rotates in the third direction, the push member 221 may move backward, and the slider protrusion 223a of the slider 223 may press the link protrusion 211a of the slider link 211. When the one end 213a of the pad link 213 is pressed by the slider link 211, the pad link 213 may rotate so that the other end 213b of the pad link 213 may press the pad separating member 215. Then, the pad separating member 215 may move toward the cleaning pad 30. The locking lever 218 may rotate in a fifth direction (a counterclockwise direction in FIG. 18) to move the pad locker 217 in a direction in which the pad locker 217 is spaced away from the cleaning pad 30. Accordingly, the lowermost cleaning pad 30a may be separated from the pad locker 217 to fall to a position at which the push member 221 is able to push the cleaning pad 30a.

Referring to FIG. 19, when the cleaning pad 30a is located at the position at which the cleaning pad 30a is able to be pushed by the push member 221, the station driver 230 may rotate the push link 232 in a fourth direction (a counterclockwise direction in FIG. 19). When the push link 232 rotates in the fourth direction, the push member 221 may move forward to move the cleaning pad 30a to the pad coupling part 203.

Figure 20:
FIG. 20 is a control block diagram of the station shown in FIG. 11 according to an embodiment of the disclosure.

FIG. 20 shows a control block diagram of the station shown in FIG. 11 according to an embodiment of the disclosure.

Referring to FIG. 20, the station 20 may include a station controller 208 and a station sensor 209.

The station controller 208 may receive information from the station sensor 209 to drive the station driver 230.

When the station sensor 209 determines that the robot cleaner 10 is located at the pad coupling part 203 and the pad fixing part 140 is lifted, the station sensor 209 may transfer information indicating the determined result to the station controller 208.

Figure 21:
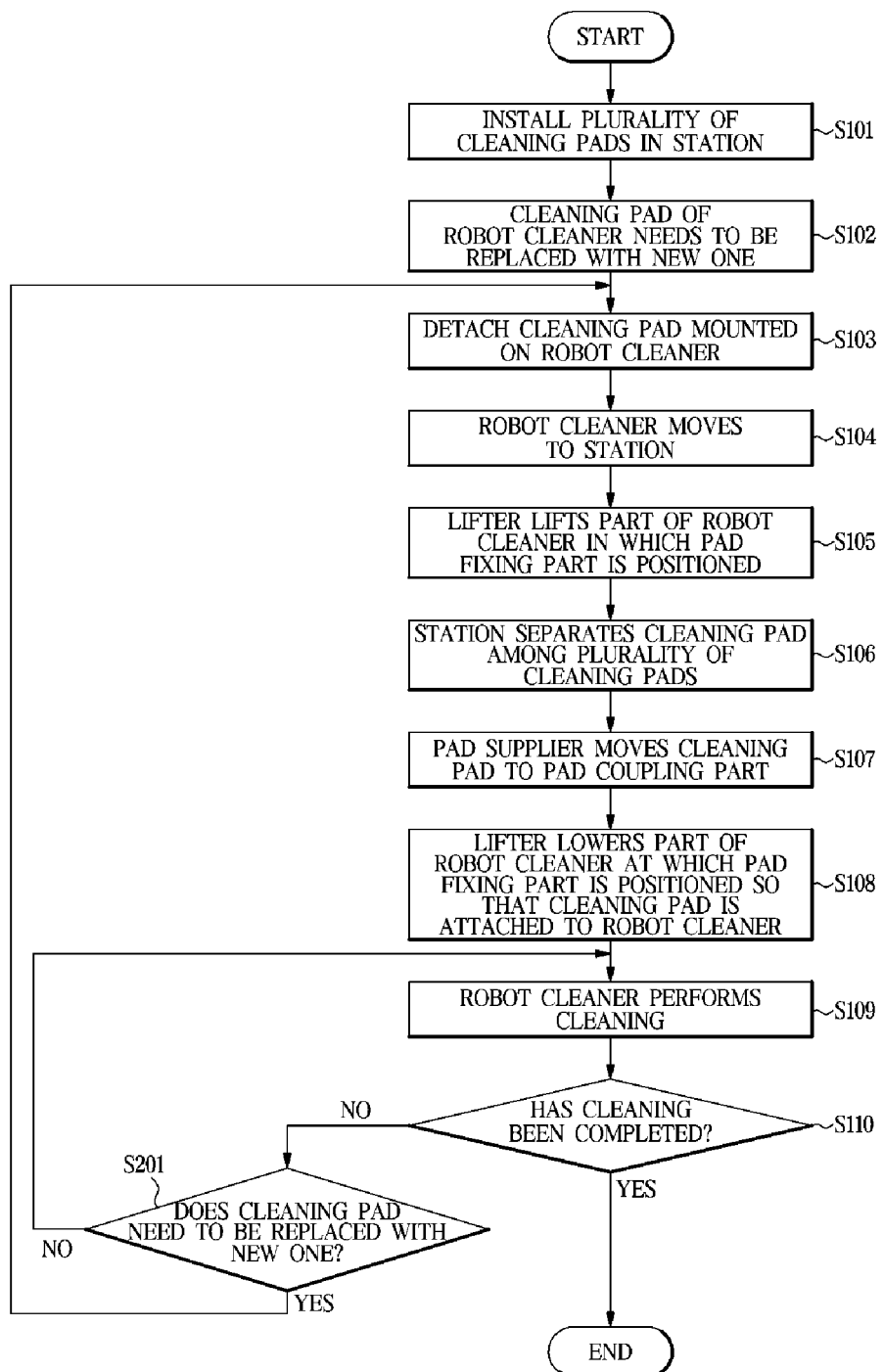
FIG. 21 is a flowchart showing a process of automatically replacing a cleaning pad with a new one in the robot cleaner shown in FIGS. 1 and 2 according to an embodiment of the disclosure.

FIG. 21 is a flowchart showing a process of automatically replacing a cleaning pad with a new one in the robot cleaner shown in FIGS. 1 and 2 according to an embodiment of the disclosure.

FIGS. 22 to 25 sequentially show operations of automatically supplying a cleaning pad to a robot cleaner in the station shown in FIGS. 1 and 2 according to various embodiments of the disclosure.

Figure 25:
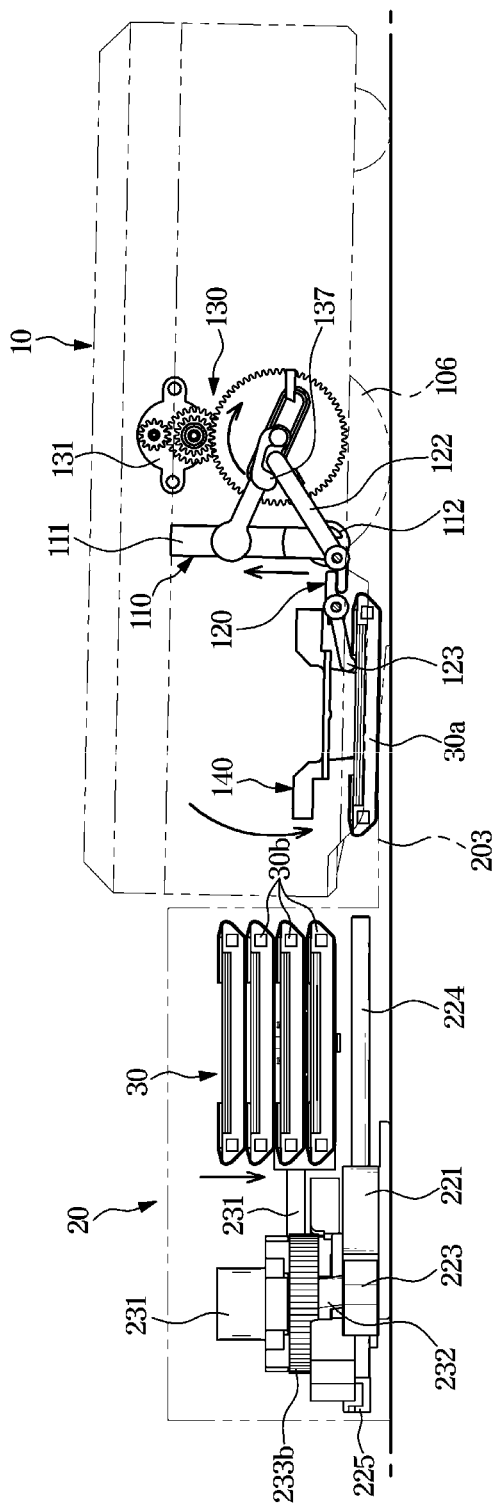

Referring to FIGS. 21 and 25, operations of the cleaning system 1 will be described.

Figure 22:
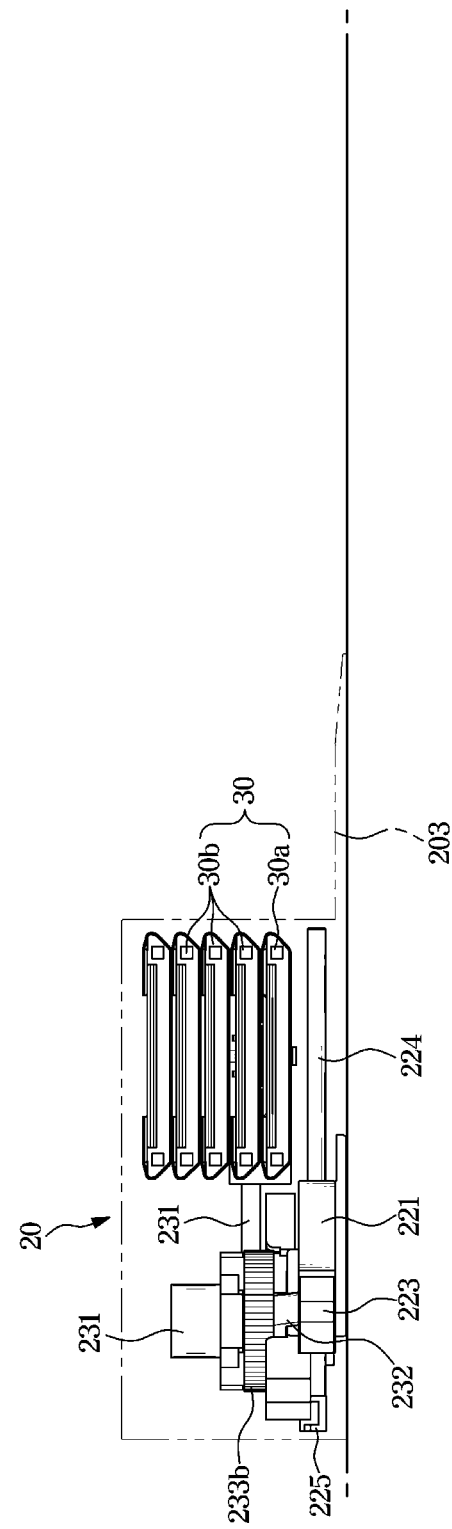
FIGS. 22, 23, 24, and 25 sequentially show operations of automatically supplying a cleaning pad to a robot cleaner in the station shown in FIGS. 1 and 2 according to various embodiments of the disclosure.

Referring to FIGS. 21 and 22, a user may install a plurality of cleaning pads 30 in advance in the station 20, in operation S101. Simultaneously, the robot cleaner 10 may perform cleaning.

During cleaning, the robot cleaner 10 may determine that a cleaning pad 30 needs to be replaced with a new one, in operation S102. More specifically, the robot cleaner 10 may determine that a degree of contamination of the cleaning pad 30 is higher than a predetermined degree of contamination, through the second cleaner sensor 109b, or that the robot cleaner 10 has performed cleaning for a predetermined time or more.

When the robot cleaner 10 determines that the cleaning pad 30 needs to be replaced with a new one, the robot cleaner 10 may move to a position spaced from the station 20. Then, the robot cleaner 10 may detach the cleaning pad 30, as shown in FIGS. 8 and 9.

After the robot cleaner 10 detaches the cleaning pad 30, the robot cleaner 10 may move to the station 20, in operation S104.

Figure 23:
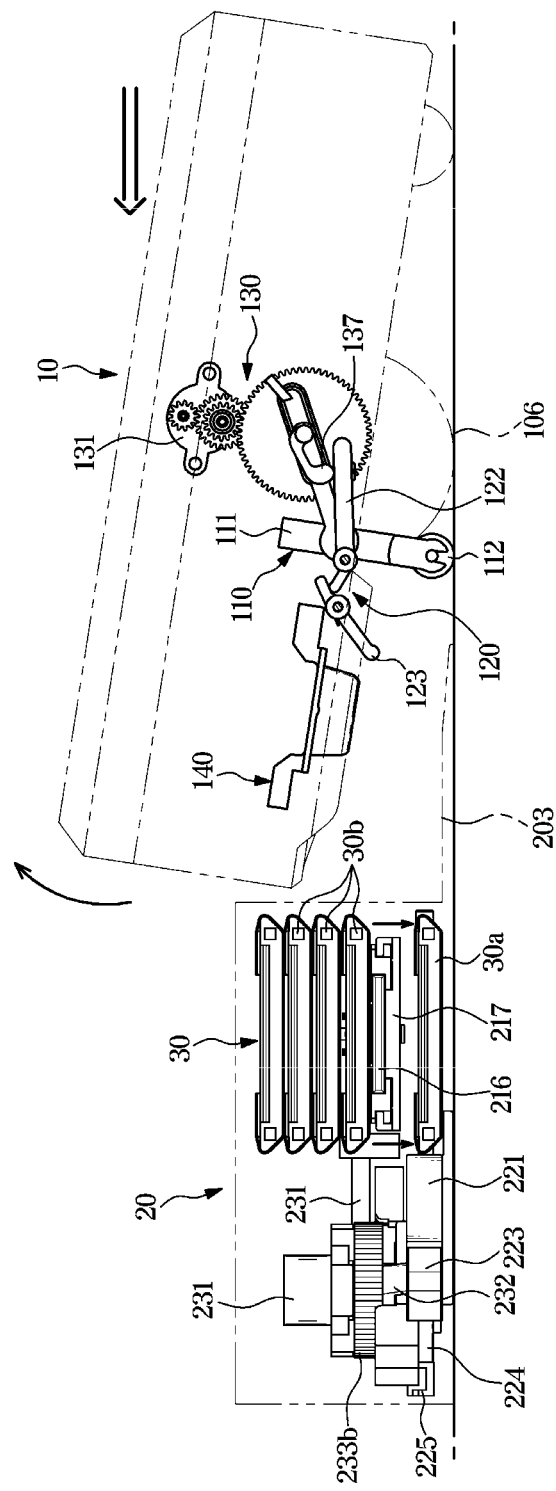

Referring to FIG. 23, the robot cleaner 10 may move to the pad coupling part 203 of the station 20. The robot cleaner 10 may be positioned such that the pad fixing part 140 faces the pad coupling part 203 of the station 20.

After the robot cleaner 10 moves to the pad coupling part 203, a part of the robot cleaner 10 in which the pad fixing part 140 is positioned may be lifted by driving of the cleaner driver 130 and the lifter 110, in operation S105.

At this time, the station 20 may detect the robot cleaner 10 positioned at the pad coupling part 203, and drive the station driver 230 to separate a cleaning pad 30a which is the lowermost one among the plurality of cleaning pads 30 from the cleaning pads 30 and to move the cleaning pad 30a to a position at which the cleaning pad 30a is able to be pressed by the push member 221, as shown in FIGS. 17 and 18, in operation S106.

Figure 24:
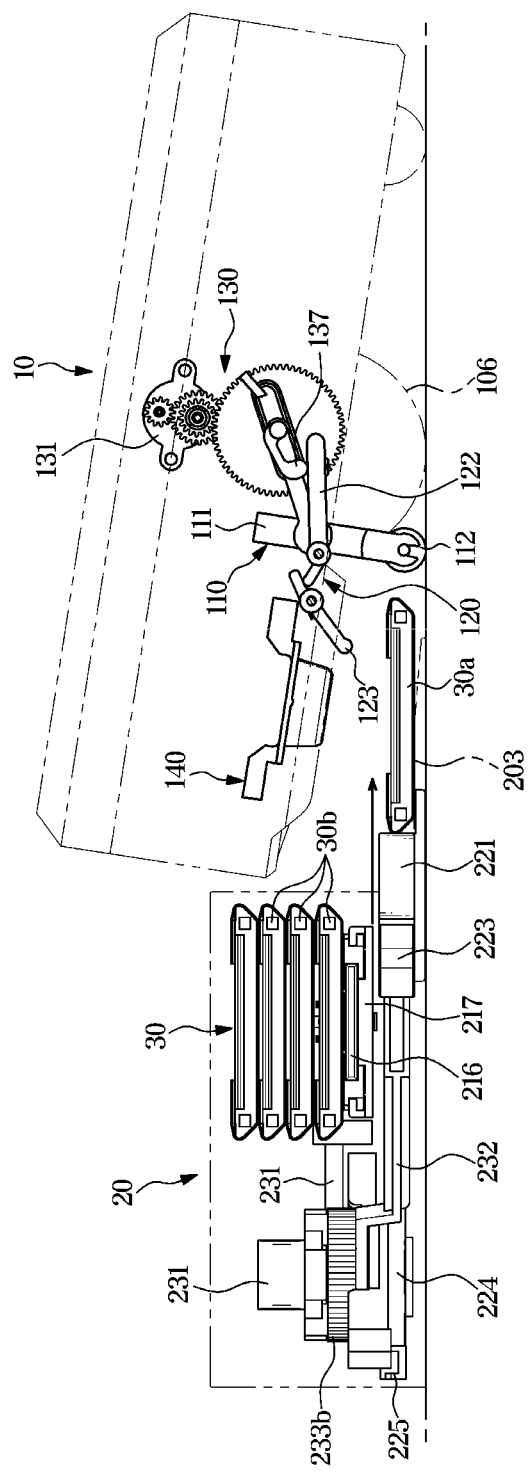

Referring to FIG. 24, when the station 20 determines that the cleaning pad 30a has been moved to the position at which the cleaning pad 30a is able to be pressed by the push member 221, the station 20 may drive the station driver 230 and the pad supplier 220 to cause the push member 221 to move the cleaning pad 30a to the pad coupling part 203, in operation S107.

Referring to FIG. 25, when the cleaning pad 30a is positioned at the pad coupling part 203, the robot cleaner 10 may drive the cleaner driver 130 and the lifter 110 to cause the lifter 110 to lower the part at which the pad fixing part 140 is positioned. Accordingly, the cleaning pad 30a positioned at the pad coupling part 203 may be attached to the robot cleaner 10, in operation S108. The cleaning pad 30a may be coupled to the pad fixing part 140 by a magnetic force. The coupling protrusion 143 may be inserted in the coupling groove 35.

Thereafter, the robot cleaner 10 may continue to perform cleaning, in operation S109.

During cleaning, the robot cleaner 10 may determine whether cleaning has been completed, in operation S110.

When the robot cleaner 10 determines that cleaning has been completed, the robot cleaner 10 may stop operating.

Meanwhile, when the robot cleaner 10 determines that cleaning has not yet been completed, the robot cleaner 10 may determine whether the cleaning pad 30 needs to be replaced with a new one, in operation S201. When the robot cleaner 10 determines that the cleaning pad 30 does not need to be replaced with a new one, the robot cleaner 10 may continue to perform cleaning. In contrast, when the robot cleaner 10 determines that the cleaning pad 30 needs to be replaced with a new one, the robot cleaner 10 may return to operation S103 of detaching the cleaning pad 30 to sequentially perform a task of replacing the cleaning pad 30 with a new one.

According to the configuration, when the cleaning system 1 according to an embodiment of the disclosure performs cleaning in a wide cleaning space, the cleaning system 1 may perform cleaning while automatically replacing the cleaning pad 30 with a new one, resulting in a user's convenience.

Figure 26:
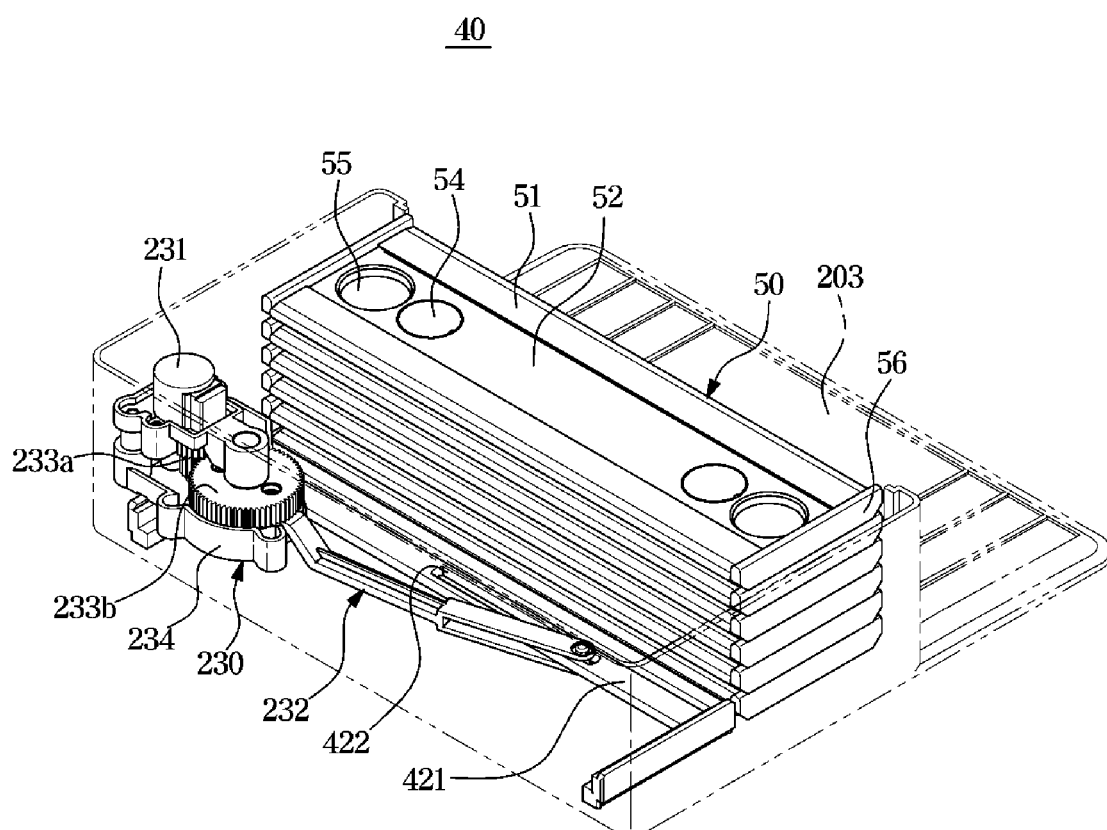
FIG. 26 shows an inside of a station according to an embodiment of the disclosure.

FIG. 26 shows an inside of a station according to an embodiment of the disclosure.

Figure 27:
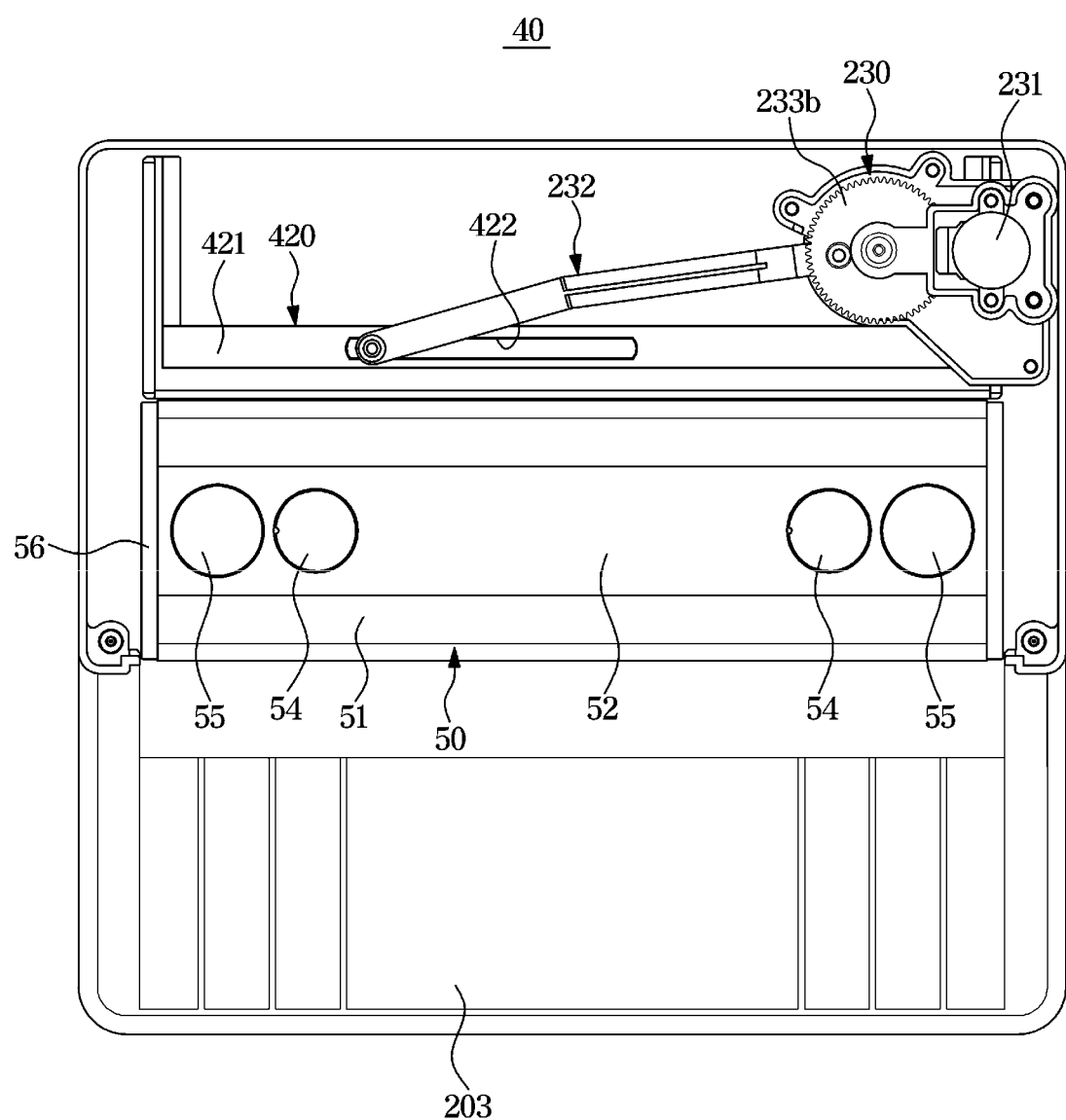
FIG. 27 is a top view showing an inside of the station shown in FIG. 26 according to an embodiment of the disclosure.

FIG. 27 is a top view showing the inside of the station shown in FIG. 26 according to an embodiment of the disclosure.

Figure 28:
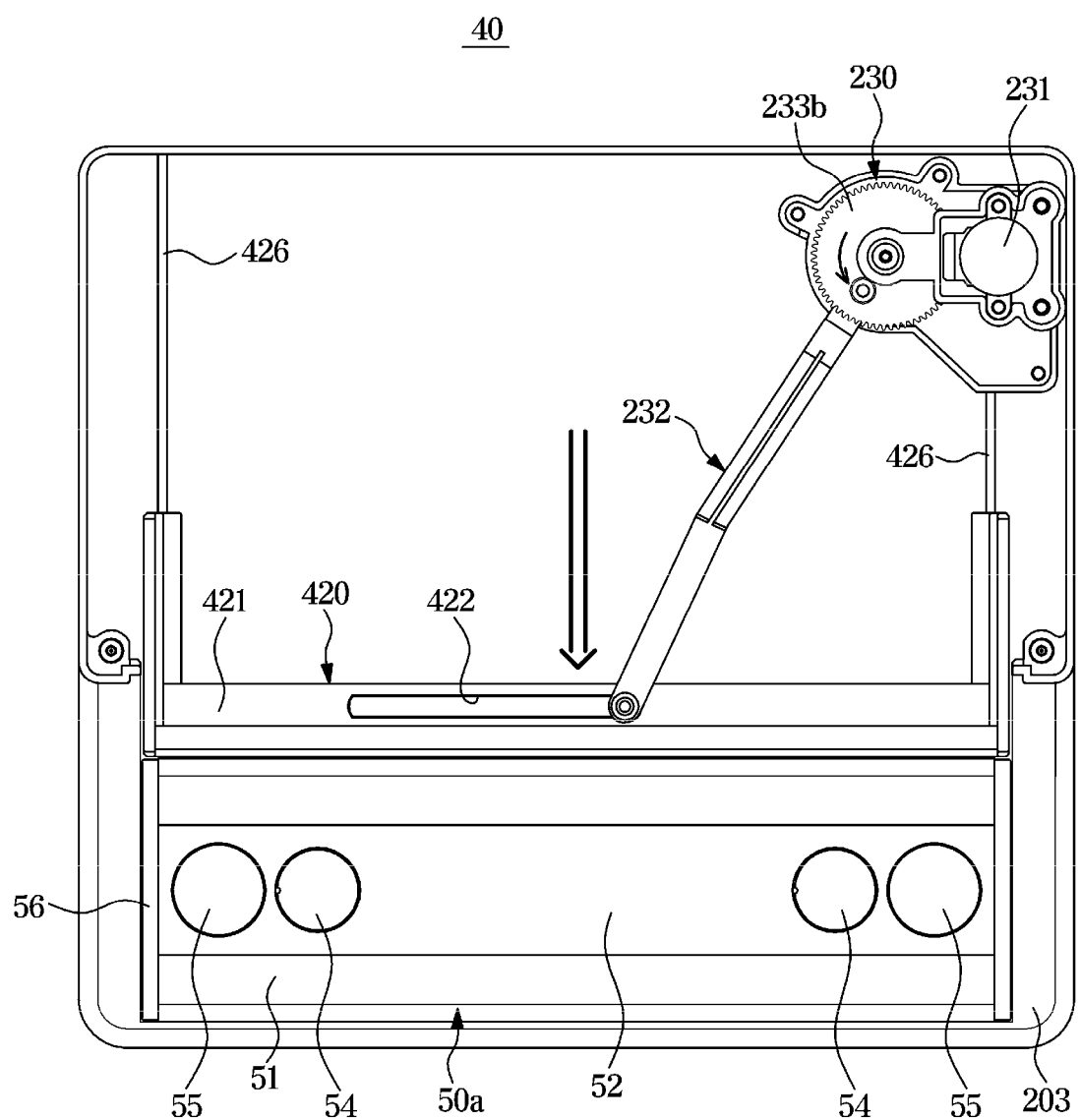
FIG. 28 shows a state in which a pad supplier of the station shown in FIG. 26 moves a cleaning pad to a pad coupling part according to an embodiment of the disclosure.

FIG. 28 shows a state in which a pad supplier of the station shown in FIG. 26 moves a cleaning pad to a pad coupling part according to an embodiment of the disclosure.

Figure 29:
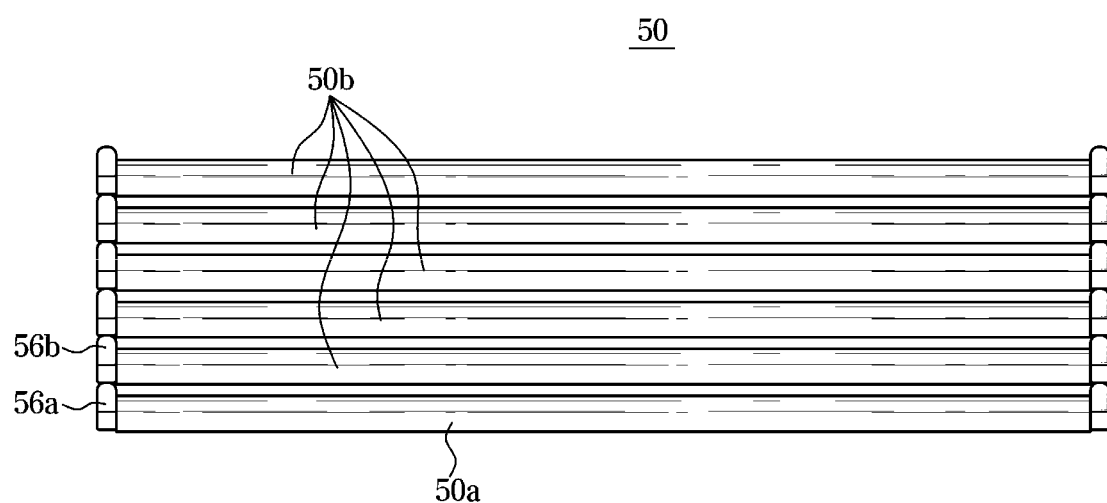
FIG. 29 shows a stacked state of a plurality of cleaning pads stored in the station shown in FIG. 26 according to an embodiment of the disclosure.

FIG. 29 shows a stacked state of a plurality of cleaning pads stored in the station shown in FIG. 26 according to an embodiment of the disclosure.

Referring to FIGS. 26 to 28, a station 40 according to various embodiments of the disclosure may not include the separating and supplying device 210, unlike the station 20 shown in FIG. 11. A configuration of the station driver 230 of the station 40 shown in FIG. 26 may be the same as that of the station driver 230 of the station 20 shown in FIG. 11, and therefore, a detailed description thereof will be omitted.

A pad supplier 420 of the station 40 may include a push member 421. The push member 421 may include a push slit 422 in which one end of the push link 232 of the station driver 230 is slidingly inserted.

The pad supplier 420 may include a guide rail 426 positioned on an inner bottom surface of the station housing 201. The guide rail 426 may guide a movement in front-back direction of the push member 421. The guide rail 426 may extend in the front-back direction. The guide rail 426 may be integrated into the station housing 201.

Referring to FIG. 29, a cleaning pad 50 may include a cleaning tissue 51 contacting a floor to clean the floor, and a pad body 52 on which the cleaning tissue 51 is fixed.

In the pad body 52, a cleaner coupling part 54 may be formed to be coupled to the robot cleaner 10. More specifically, the cleaner coupling part 54 may include a magnetic body to be coupled to the fixing member 142 provided in the robot cleaner 10 by a magnetic force. Meanwhile, the cleaner coupling part 54 may include an electromagnet to have a magnetic force as necessary.

In the pad body 52, a coupling groove 55 may be formed in which a coupling protrusion 143 of the robot cleaner 10 is inserted. When the cleaning pad 30 is attached to the robot cleaner 10, the coupling protrusion 143 may be inserted in the coupling groove 55. Due to coupling of the coupling protrusion 143 with the coupling groove 55, the cleaning pad 50 may be prevented from being detached from the robot cleaner 10 by friction with the floor when the robot cleaner 10 travels horizontally. That is, the coupling protrusion 143 and the coupling groove 55 may prevent the cleaning pad 50 from being detached from the robot cleaner 10, even when a magnetic force generated between the cleaner coupling part 54 and the fixing member 142 is smaller than a friction force generated between the cleaning tissue 51 and the floor.

The cleaning pad 50 may include a pad support 56 positioned at both ends in longitudinal direction of the pad body 52. The pad support 56 may extend in the up-down direction. The pad support 56 may extend in a direction in which the plurality of cleaning pads 50 are stacked.

Although the station 40 according to another embodiment of the disclosure does not include a separate configuration for moving a cleaning pad 50a which is the lowermost one of the cleaning pads 50 to a position at which the cleaning pad 50a is able to be pushed by the push member 421, a friction force between the cleaning pads 50 may be reduced because each of the cleaning pads 50 has the pad support 56. Therefore, the cleaning pads 50 may be moved sequentially to the pad coupling part 203 by the push member 421, starting from the lowermost cleaning pad 50a.

That is, the cleaning pads 50 may be stacked starting from a position at which the cleaning pad 50a is able to be pushed by the push member 421, unlike the cleaning pads 30 stacked in the station 20 shown in FIG. 11. After the robot cleaner 10 moves to the pad coupling part 203, the push member 421 may move forward to move the cleaning pad 50a which is the lowermost one among the cleaning pads 50 to the pad coupling part 203. At this time, the pad support 56a of the lowermost cleaning pad 50a may move while sliding on a pad support 56b of a cleaning pad 50b positioned directly above the cleaning pad 50a among the stacked cleaning pads 50b. The cleaning pads 50a and 50b may contact each other at the pad supports 56a and 56b, and accordingly, the cleaning pads 50a and 50b may contact each other at relatively small areas so that a friction force is reduced. Accordingly, the lowermost cleaning pad 50a may slide smoothly with respect to the stacked cleaning pads 50.

Therefore, the station 40 according to another embodiment of the disclosure may provide the cleaning pad 50a among the plurality of cleaning pads 50 to the pad coupling part 203 through a relatively simple configuration.

Figure 30:
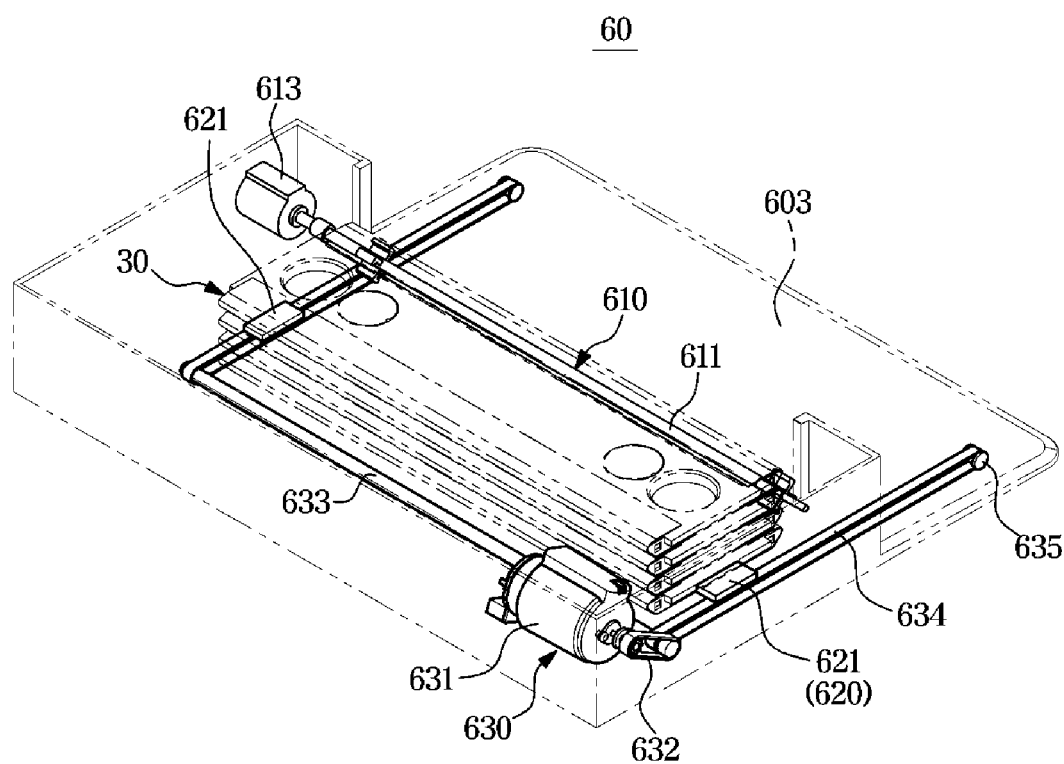
FIG. 30 shows an inside of a station according to another embodiment of the disclosure according to an embodiment of the disclosure.

FIG. 30 shows an inside of a station according to an embodiment of the disclosure.

Figure 31:
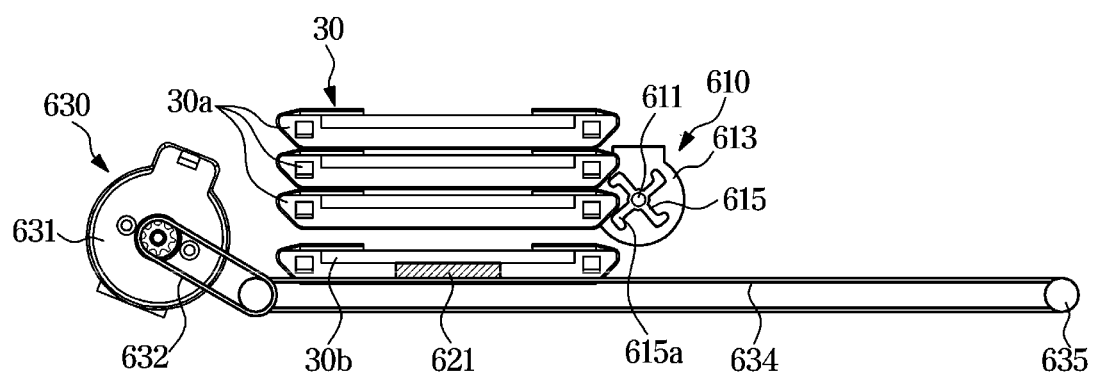
FIG. 31 shows a side of the station shown in FIG. 30 according to an embodiment of the disclosure.

FIG. 31 shows a side of the station shown in FIG. 30.

Figure 32:
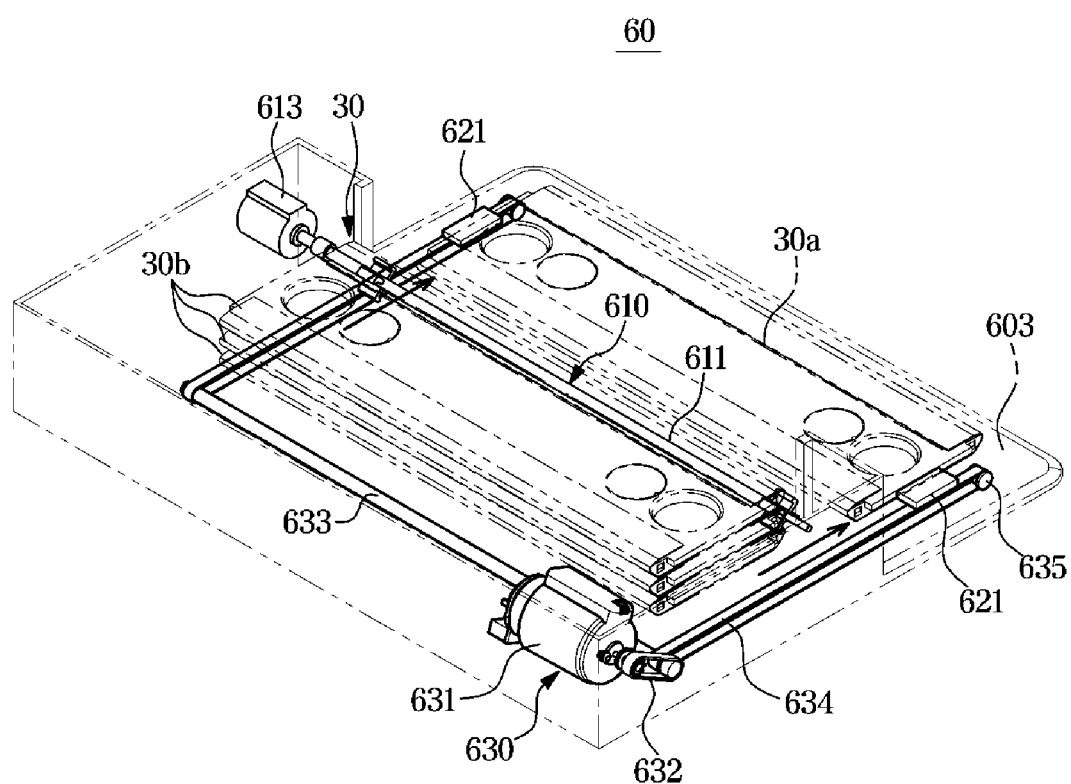
FIG. 32 shows an operation of providing a cleaning pad to a pad coupling part in the station shown in FIG. 30 according to an embodiment of the disclosure.

FIG. 32 shows an operation of providing a cleaning pad to a pad coupling part in the station shown in FIG. 30 according to an embodiment of the disclosure.

Referring to FIGS. 30 to 32, a station 60 according to an embodiment of the disclosure may include a separating and supplying device 610, a pad supplier 620, and a station driver 630. The cleaning pad 30 shown in FIG. 3 may be applied to the station 60 shown in FIGS. 30 to 32.

The separating and supplying device 610 may separate a cleaning pad 30a which is the lowermost one among a plurality of cleaning pads 30, and supply the cleaning pad 30a to a position at which the cleaning pad 30a is able to be pushed by a push member 621. The separating and supplying device 610 may include a pad shaft 611, a pad shaft driver 613, and a pad separating member 615.

The pad shaft 611 may rotate when the pad shaft driver 613 is driven. The pad separating member 615 may be positioned in at least one end of the pad shaft 611. The pad separating member 615 may rotate when the pad shaft 611 rotates. The pad separating member 615 may include a plurality of pad support ribs 615a extending in a radial direction from a rotation axis.

Referring to FIG. 31, when the pad shaft 611 rotates by 90° by the pad shaft driver 613, the cleaning pad 30a except for the stacked cleaning pads 30b among the cleaning pads 30 may be lowered.

When the station driver 630 is driven, the pad supplier 620 may move in the front-back direction. The pad supplier 620 may include a push member 621.

The push member 621 may support the cleaning pad 30*a* separated by the separating and supplying device 610. The push member 621 may support the cleaning pad 30*a*, and move the cleaning pad 30*a* to a pad coupling part 603. The push member 621 may be fixed to a second belt 634.

The station driver 630 may move the pad supplier 620. The station driver 630 may include a station driving source 631, a first belt 632, a first belt shaft 633, the second belt 634, and a second belt shaft 635. The first belt 632, the first belt shaft 633, and the second belt 634 may be considered as connection members in that first belt 632, the first belt shaft 633, and the second belt 634 connect the push member 621 with the station driving source 631.

The station driving source 631 may include a motor. The station driving source 631 may generate power for driving the push member 621. The station driving source 631 may be a motor that is rotatable forward and backward.

The first belt 632 may be connected with the station driving source 631. The first belt 632 may receive power from the station driving source 631. The first belt 632 may be coupled to the station driving source 631 and the first belt shaft 633 to rotate.

The first belt shaft 633 may rotate when the first belt 632 rotates. The first belt shaft 633 may receive power from the first belt 632. The first belt shaft 633 may rotatably support the first belt 632 and the second belt 634.

The second belt 634 may be connected with the first belt shaft 633. The second belt 634 may receive power from the first belt shaft 633. A plurality of second belts 634 may be provided, and accordingly, the second belts 634 may be respectively connected with both ends of the first belt shaft 633. At a portion of the second belt 634, the push member 621 may be fixed. The second belt 634 may be coupled to the first belt shaft 633 and the second belt shaft 635 to rotate.

The second belt shaft 635 may rotate when the second belt 634 rotates. A plurality of second belt shafts 635 may be provided, like the second belts 634. The second belt shaft 635 may rotatably support the second belt 634.

Referring to FIG. 32, when the cleaning pad 30*a* is located at a position at which the cleaning pad 30*a* is able to be pushed by the push member 621, by the separating and supplying device 610, the station driving source 631 may rotate the first belt 632. When the first belt 632 rotates, the first belt shaft 633 may rotate. When the first belt shaft 633 rotates, the second belt 634 may rotate. When the second belt 634 rotates, the push member 621 may support the cleaning pad 30*a* and move the cleaning pad 30*a* to the pad coupling part 603. After the push member 621 moves the cleaning pad 30*a* to the pad coupling part 603, the station driving source 631 may rotate in the opposite direction to return the push member 621 to its initial position.

Figure 33:
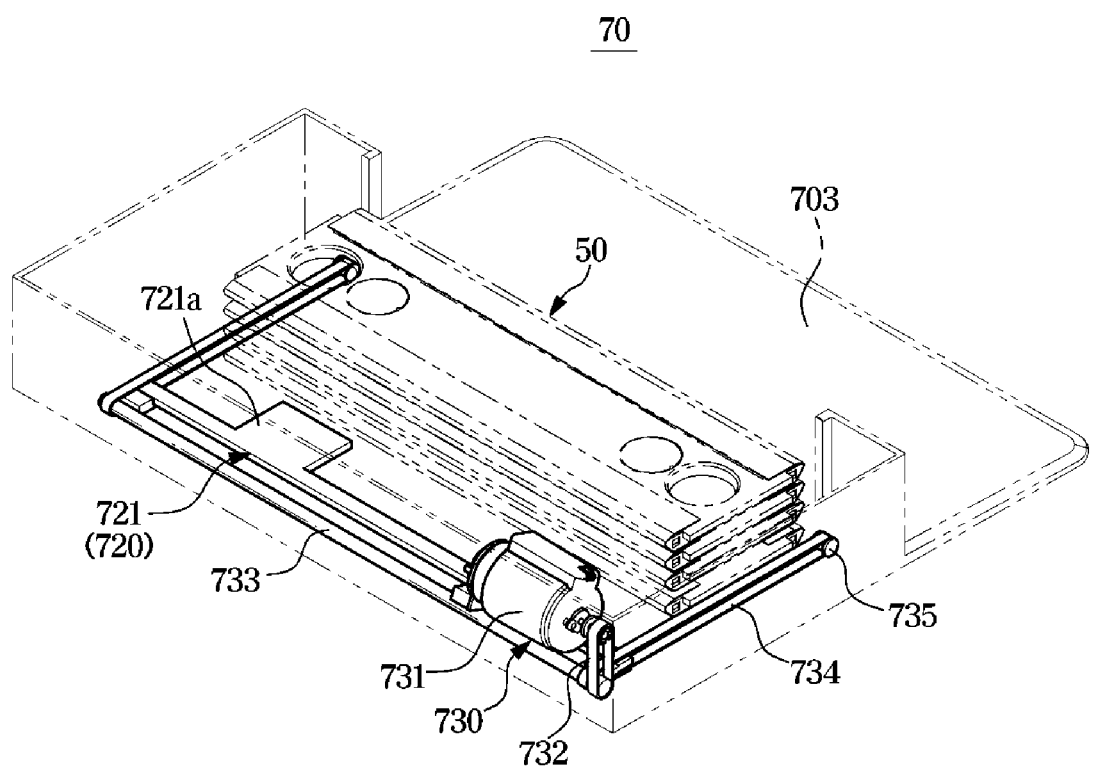
FIG. 33 shows an inside of a station according to an embodiment of the disclosure.
Figure 34:
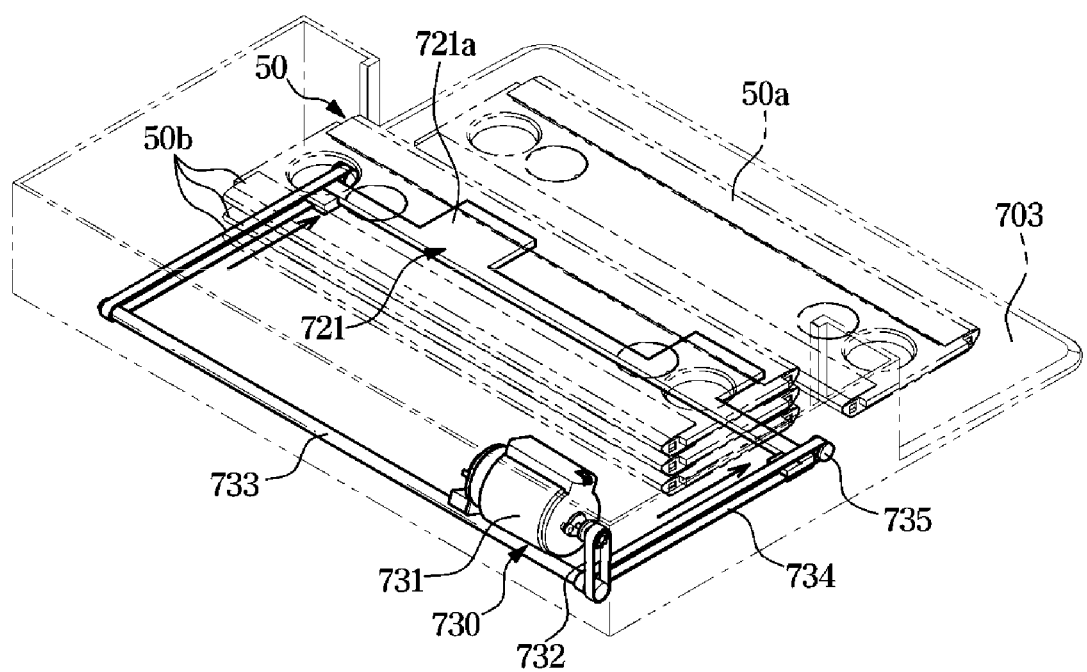
FIG. 34 shows an operation of providing a cleaning pad to a pad coupling part in the station shown in FIG. 33 according to an embodiment of the disclosure.

FIG. 33 shows an inside of a station according to an embodiment of the disclosure, and FIG. 34 shows an operation of providing a cleaning pad to a pad coupling part in the station shown in FIG. 33 according to an embodiment of the disclosure.

Referring to FIGS. 33 and 34, a station 70 according to various embodiments of the disclosure may not include a separating and supplying device for separating a cleaning pad, unlike the station 40 shown in FIG. 25. The cleaning pad 50 shown in FIG. 25 may be applied to the station 70 shown in FIGS. 33 and 34. The station 70 may include a pad supplier 720 and a station driver 730.

When the station driver 730 is driven, the pad supplier 720 may move in the front-back direction. The pad supplier 720 may include a push member 721.

The push member 721 may move a cleaning pad 50*a* which is the lowermost one among a plurality of cleaning pads 50, except for the remaining cleaning pads 50*b*, to a pad coupling part 703. Both ends of the push member 721 may be fixed to a second belt 734. The push member 721 may include a push protrusion 721*a* protruding toward the cleaning pad 50.

The station driver 730 may move the pad supplier 720. The station driver 730 may include a station driving source 731, a first belt 732, a first belt shaft 733, the second belt 734, and a second belt shaft 735. Herein, the first belt 732, the first belt shaft 733, and the second belt 734 may be considered as connection members in that the first belt 732, the first belt shaft 733, and the second belt 734 connect the station driving source 731 with the push member 721.

The station driving source 731 may include a motor. The station driving source 731 may generate power for moving the push member 721. The station driving source 731 may be a motor that is rotatable forward and backward.

The first belt 732 may be connected with the station driving source 731. The first belt 732 may receive power from the station driving source 731. The first belt 732 may be coupled to the station driver 730 and the first belt shaft 733 to rotate.

The first belt shaft 733 may rotate when the first belt 732 rotates. The first belt shaft 733 may receive power from the first belt 732. The first belt shaft 733 may rotatably support the first belt 732 and the second belt 734.

The second belt 734 may be connected with the first belt shaft 733. The second belt 734 may receive power from the first belt shaft 633. A plurality of second belts 734 may be provided, and accordingly, the second belts 734 may be respectively connected with both ends of the first belt shaft 733. At a portion of the second belt 734, the push member 721 may be fixed. The second belt 734 may be coupled to the first belt shaft 733 and the second belt shaft 735 to rotate.

The second belt shaft 735 may rotate when the second belt 734 rotates. A plurality of second belt shafts 735 may be provided, like the second belts 734. The second belt shaft 735 may rotatably support the second belt 734.

Referring to FIG. 34, the station driving source 731 may rotate the first belt 732. When the first belt 732 rotates, the first belt shaft 733 may rotate, and when the first belt shaft 733 rotates, the second belt 734 may rotate. When the second belt 734 rotates, the push member 721 may push the cleaning pad 50*a* toward the pad coupling part 703. The station 70 shown in FIG. 34 may not perform an operation of separating a cleaning pad among the plurality of cleaning pads, unlike the station 60 shown in FIG. 32.

After the push member 721 moves the cleaning pad 50*a* to the pad coupling part 703, the station driving source 731 may rotate in the opposite direction to return the push member 721 to its initial position.

Figure 35:
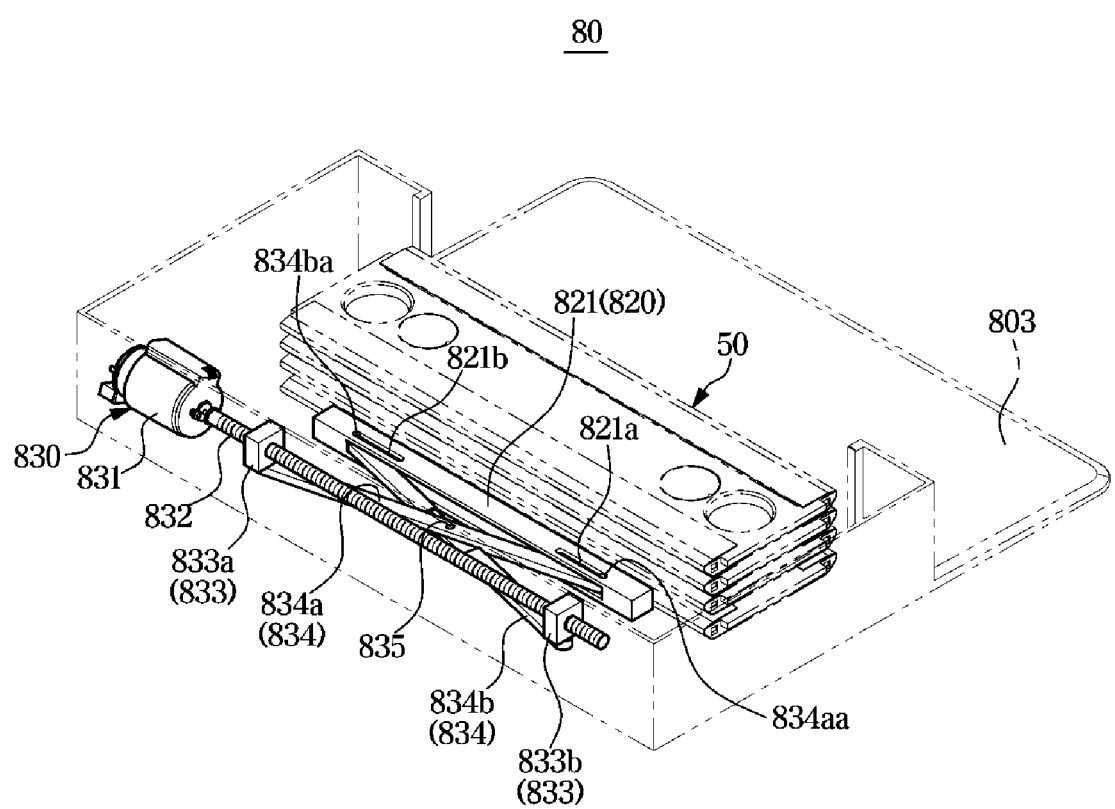
FIG. 35 shows an inside of a station according to an embodiment of the disclosure.
Figure 36:
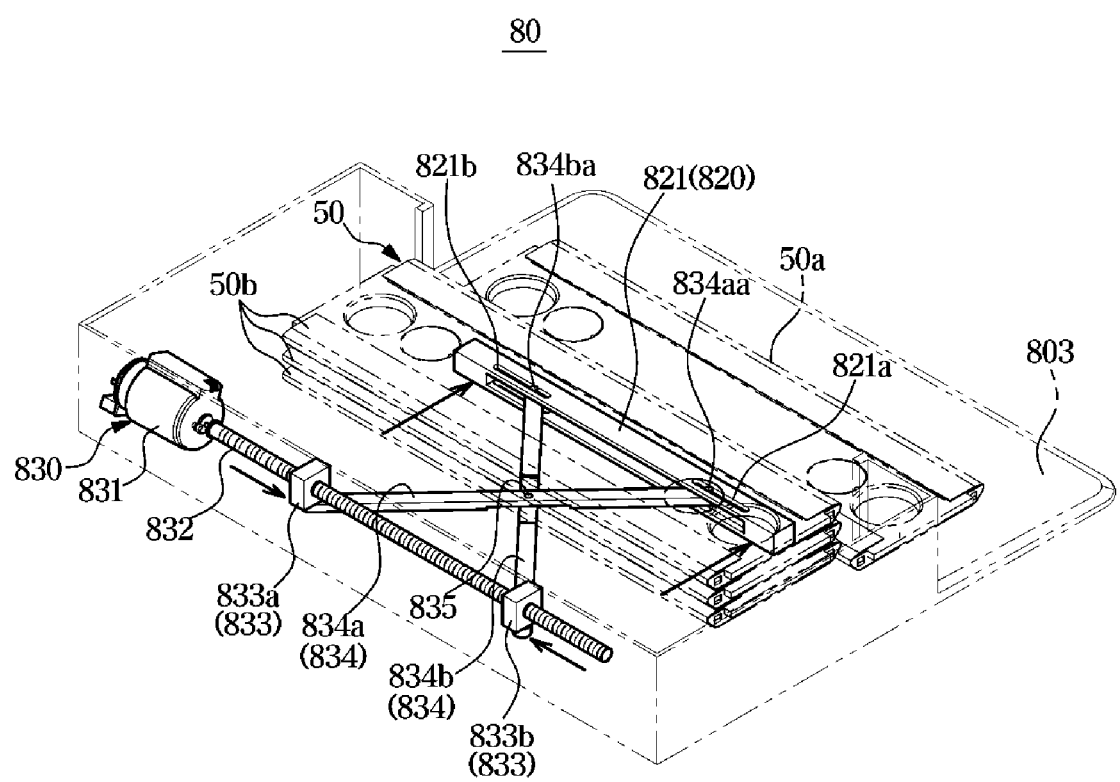
FIG. 36 shows an operation of providing a cleaning pad to a pad coupling part in the station shown in FIG. 35 according to an embodiment of the disclosure.

FIG. 35 shows an inside of a station according to an embodiment of the disclosure, and FIG. 36 shows an operation of providing a cleaning pad to a pad coupling part in the station shown in FIG. 35 according to an embodiment of the disclosure.

Referring to FIGS. 35 and 36, a station 80 according to various embodiments of the disclosure may not include a separating and supplying device for separating a cleaning pad, like the station 40 shown in FIG. 25. The cleaning pad 50 shown in FIG. 25 may be applied to the station 80 shown in FIGS. 35 and 36. The station 80 may include a pad supplier 820 and a station driver 830.

The pad supplier 820 may move in the front-back direction when the station driver 830 is driven. The pad supplier 820 may include a push member 821. The push member 821 may include a first push link slit 821a in which one end 834aa of a first push link 834a is slidingly inserted, and a second push link slit 821b in which one end 834ba of a second push link 834b is slidingly inserted.

The push member 821 may move a cleaning pad 50a which is the lowermost one among a plurality of cleaning pads 50, except for the remaining stacked cleaning pads 50b, to the pad coupling part 803.

The station driver 830 may move the pad supplier 820. The station driver 830 may include a station driving source 831, a driving shaft 832, a power conversion member 833, and a push link 834. Herein, the driving shaft 832, the power conversion member 833, and the push link 834 may be considered as connection members in that the driving shaft 832, the power conversion member 833, and the push link 834 connect the station driving source 831 with the push member 821.

The station driving source 831 may include a motor. The station driving source 831 may generate power for moving the push member 821. The station driving source 831 may be a motor which is rotatable forward and backward.

The driving shaft 832 may extend along a direction in which a shaft of the station driving source 831 extends. The driving shaft 832 may rotate when the station driving source 831 rotates. In at least one part of an outer circumferential surface of the driving shaft 832, a thread may be formed.

The power conversion member 833 may be coupled to the driving shaft 832 in such a way to correspond to the thread formed in the outer circumferential surface of the driving shaft 832. In an inside hole of the power conversion member 833, a thread may be formed to correspond to the thread formed in the outer circumferential surface of the driving shaft 832. The power conversion member 833 may convert a rotational force of the driving shaft 832 into a linear motion. When the driving shaft 832 rotates, the power conversion member 833 may perform a linear motion along a direction in which the driving shaft 832 extends. The power conversion member 833 may include a first power conversion member 833a for transferring power to the first push link 834a, and a second power conversion member 833b for transferring power to the second push link 834b.

The push link 834 may receive power from the power conversion member 833 and transfer the power to the push member 821. The push link 834 may include the first push link 834a rotatably connected with the first power conversion member 833a, and the second push link 834b rotatably connected with the second power conversion member 833b.

The first push link 834a and the second push link 834b may be rotatably coupled to a link connection shaft 835. The first push link 834a may be coupled to the second push link 834b, like a pair of scissors. The link connection shaft 835 may be movable in the front-back direction.

Referring to FIG. 36, the station driving source 831 may rotate the driving shaft 832. When the driving shaft 832 rotates, the first power conversion member 833a and the second power conversion member 833b may move in a direction in which the first power conversion member 833a approaches the second power conversion member 833b.

When the first power conversion member 833a moves, the first push link 834a may rotate with respect to the link connection shaft 835, and one end 834aa of the first push link 834a inserted in the first push link slit 821a may slide in the first push link slit 821a to press the push member 821 toward the pad coupling part 803.

When the second power conversion member 833b moves, the second push link 834b may rotate with respect to the link connection shaft 835, and one end 834ba of the second push link 834b inserted in the first push link slit 821b may slide in the second push link slit 821b to press the push member 821 toward the pad coupling part 803. The station 80 shown in FIG. 36 may not perform an operation of separating a cleaning pad from among a plurality of cleaning pads, unlike the station 60 shown in FIG. 32.

After the push member 821 moves the cleaning pad 50a to the pad coupling part 803, the station driving source 831 may rotate in the opposite direction to return the push member 821 to its initial position.

According to a concept of the disclosure, the cleaning system may detach a pad of the robot cleaner automatically at a position at which the robot cleaner is spaced from the station, and, when the robot cleaner is located at the station, the cleaning system may attach a pad automatically supplied from the station to the robot cleaner, resulting in an increase of user convenience.

According to a concept of the disclosure, the robot cleaner may attach or detach a pad automatically, resulting in an increase of user convenience.

According to a concept of the disclosure, the station may supply a pad automatically, resulting in an increase of user convenience.

While the disclosure has been shown and described with reference to various embodiments thereof, it will be understood by those skilled in the art that various changes inform and details may be made therein without departing from the spirit and scope of the disclosure as defined by the appended claims and their equivalents.

What is claimed is:

1. A cleaning system comprising:
   a robot cleaner including:
      a pad fixing part on which a cleaning pad is detachably mounted,
      a lifter to lift a part of the robot cleaner at which the pad fixing part is positioned,
      a pad detacher to detach the cleaning pad mounted on the pad fixing part, and
      a cleaner driver to drive the pad detacher; and
   a station including:
      a pad storage box in which a cleaning pad that is to be provided to the robot cleaner is stored,
      a pad coupling part on which a cleaning pad that is to be coupled to the robot cleaner is rested,
      a pad supplier to supply the cleaning pad stored in the pad storage box to the pad coupling part,
      a station driver to drive the pad supplier, the station driver comprising:
         a station driving source, and
         a connection member to transfer power generated by the station driving source to the pad supplier.

2. The cleaning system according to claim 1, wherein each of the pad fixing part and the cleaning pad comprises a magnetic body.

3. The cleaning system according to claim 1,
   wherein the lifter is driven by the cleaner driver, and
   wherein the cleaner driver comprises a link actuator to transfer power to the lifter and the pad detacher.

4. The cleaning system according to claim 3,
   wherein the link actuator is rotatably coupled to a cleaner housing of the robot cleaner, and wherein the lifter comprises a lift body rotatably coupled to the link actuator.

5. The cleaning system according to claim 4, wherein the cleaner housing of the robot cleaner comprises a lift guide to guide a movement of the lifter.

6. The cleaning system according to claim 3, wherein the pad detacher comprises:
a detacher holder fixed to a cleaner housing of the robot cleaner;
a detacher link rotatably coupled to the detacher holder such that one end of the detacher link is rotatable by being pressed by the link actuator; and
a detacher rotatably coupled to the detacher holder such that one end of the detacher is rotatable by being pressed by the detacher link and the other end of the detacher is rotatable in a direction in which the cleaning pad is detached from the pad fixing part.

7. The cleaning system according to claim 6,
wherein, when the link actuator rotates in a first direction, the detacher link rotates in a second direction that is opposite to the first direction, and the detacher rotates in the first direction by the rotation of the detacher link to detach the cleaning pad from the pad fixing part, and
wherein, when the link actuator rotates in the second direction, the detacher link rotates in the first direction, and the detacher rotates in the second direction to be spaced away from the cleaning pad.

8. The cleaning system according to claim 1,
wherein the pad supplier comprises a push member that is driven by the station driver to move a cleaning pad among a plurality of cleaning pads stored in the pad storage box to the pad coupling part.

9. The cleaning system according to claim 8,
wherein the connection member includes at least one of a push link or a belt.

10. The cleaning system according to claim 8, wherein the station comprises a separating and supplying device to move the cleaning pad among the plurality of cleaning pads stacked in the pad storage box to a push position at which the push member is able to push the cleaning pad.

11. The cleaning system according to claim 10, wherein the separating and supplying device comprises:
a link support fixed to a station housing of the station;
a pad link rotatably coupled to the link support;
a slider link to press one end of the pad link when the slider link is pressed by a slider positioned at one end of the push member;
a pad separating member to move to a position of supporting a remaining cleaning pad except for the cleaning pad moved to the push position among the plurality of cleaning pads stored in the pad storage box when the pad separating member is pressed by the other end of the pad link; and
a pad locker to move to a position of releasing the supporting on the cleaning pad moved to the push position, when the pad separating member moves to the position of supporting the remaining cleaning pad among the plurality of cleaning pads stored in the pad storage box except for the cleaning pad moved to the push position.

12. The cleaning system according to claim 11, wherein the separating and supplying device comprises a locking lever connecting the pad separating member to the pad locker such that the pad separating member interworks with the pad locker.

13. The cleaning system according to claim 11, wherein, when the push member moves in an opposite direction of a direction in which the cleaning pad moves to the pad coupling part, the slider presses the slider link.

14. The cleaning system according to claim 11, wherein the separating and supplying device further comprises a separating elastic member to apply an elastic force to the pad separating member in a direction in which the pad separating member releases the supporting on the remaining cleaning pad except for the cleaning pad moved to the push position among the plurality of cleaning pads.

15. The cleaning system according to claim 8, wherein at both ends of the cleaning pad, a pad support extends in a direction in which the plurality of cleaning pads are stacked in the pad storage box.

16. A robot cleaner comprising:
a pad fixing part on which a cleaning pad is detachably mounted;
a lifter to lift a part of the robot cleaner at which the pad fixing part is positioned;
a pad detacher to detach the cleaning pad mounted on the pad fixing part; a cleaner driver to drive the pad detacher; and
at least one processor configured to control the robot cleaner.

17. The robot cleaner according to claim 16, wherein each of the pad fixing part and the cleaning pad comprises a magnetic body.

18. The robot cleaner according to claim 16,
wherein the lifter is driven by the cleaner driver, and
wherein the cleaner driver includes a link actuator to transfer power to the lifter and the pad detacher.

19. A station comprising:
a pad storage box in which a plurality of cleaning pads are stored;
a pad coupling part on which a cleaning pad that is to be coupled to a robot cleaner is rested;
a pad supplier to move a cleaning pad among the plurality of cleaning pads stored in the pad storage box to the pad coupling part; and
a station driver to drive the pad supplier, the station driver comprising:
a station driving source, and
a connection member to transfer power generated by the station driving source to the pad supplier.

20. The station according to claim 19, wherein at both ends of each of the plurality of cleaning pads stored in the pad storage box, a pad support extends in a direction in which the plurality of cleaning pads are stacked in the pad storage box.

* * * * *